United States Patent
Porter et al.

(10) Patent No.: US 11,021,327 B2
(45) Date of Patent: Jun. 1, 2021

(54) TELESCOPIC MATERIAL CONVEYER APPARATUS

(71) Applicant: CLEASBY LLC, San Francisco, CA (US)

(72) Inventors: Robin D Porter, Mountain Green, UT (US); Chad T Porter, Mountain Green, UT (US); Darren L Degraw, Farmington, UT (US)

(73) Assignee: Cleasby LLC, San Francisco, CA (US)

( * ) Notice: Subject to any disclaimer, the term of this patent is extended or adjusted under 35 U.S.C. 154(b) by 46 days.

(21) Appl. No.: 15/643,420

(22) Filed: Jul. 6, 2017

(65) Prior Publication Data
US 2017/0305672 A1 Oct. 26, 2017

Related U.S. Application Data

(63) Continuation-in-part of application No. 15/370,819, filed on Dec. 6, 2016, now Pat. No. 9,783,368, and a
(Continued)

(51) Int. Cl.
*B65G 15/62* (2006.01)
*B65G 15/44* (2006.01)
(Continued)

(52) U.S. Cl.
CPC ............... *B65G 15/62* (2013.01); *B60P 1/38* (2013.01); *B65G 15/26* (2013.01); *B65G 15/44* (2013.01);
(Continued)

(58) Field of Classification Search
CPC ........ B65G 15/26; B65G 15/44; B65G 15/62; B65G 15/64; B65G 21/00; B65G 21/02;
(Continued)

(56) References Cited

U.S. PATENT DOCUMENTS 3,825,107 A * 7/1974 Cary ...................... B65G 15/26
198/313
5,498,119 A * 3/1996 Faivre ...................... B60P 1/36
198/313
(Continued)

*Primary Examiner* — Gene O Crawford
*Assistant Examiner* — Keith R Campbell
(74) *Attorney, Agent, or Firm* — Lamon Patent Services; Cynthia S. Lamon

(57) ABSTRACT

A telescopic material conveyer apparatus has a main boom assembly reinforced by a steel saddle frame connected to a turn table and a lift mechanism, an extension boom assembly adapted by two or more roller assemblies and connecting hardware to travel mechanically within the main boom assembly and to extend therefrom, one or more connected drive motors, a conveyer belt supported by frame architecture and a pulley and drive chain system, at least one hydraulic motor having operative connection to the turntable, lift mechanism and to a belt drive drum, at least one hydraulic valve connected inline in the hydraulic line controlling the belt drive motor, the valve electronically operable via input received from a load sensor integrated within or to the lift mechanism, a programmable load threshold determining open and close operation states of the valve and directing run and stop state operations of the conveyer belt.

3 Claims, 23 Drawing Sheets

Related U.S. Application Data continuation-in-part of application No. 14/985,227, filed on Dec. 30, 2015, now Pat. No. 9,611,098.

(51) Int. Cl.

| | |
|---|---|
| *B65G 15/64* | (2006.01) |
| *B65G 21/02* | (2006.01) |
| *B65G 21/00* | (2006.01) |
| *B65G 15/26* | (2006.01) |
| *B65G 21/14* | (2006.01) |
| *B65G 41/00* | (2006.01) |
| *B60P 1/38* | (2006.01) |

(52) U.S. Cl.
CPC ............ *B65G 15/64* (2013.01); *B65G 21/00* (2013.01); *B65G 21/02* (2013.01); *B65G 21/14* (2013.01); *B65G 41/005* (2013.01); *B65G 2207/10* (2013.01); *B65G 2207/48* (2013.01)

(58) Field of Classification Search
CPC ...... B65G 21/14; B65G 21/20; B65G 41/005; B65G 2207/10; B65G 2207/48; B60P 1/36; B60P 1/38

USPC ......................................................... 198/313
See application file for complete search history.

(56) References Cited

U.S. PATENT DOCUMENTS

| | | | | |
|---|---|---|---|---|
| 5,685,687 | A * | 11/1997 | Frye ........................ | B60P 1/36 198/809 |
| 5,984,077 | A * | 11/1999 | Frye ........................ | B60P 1/36 198/317 |
| 6,581,759 | B1 * | 6/2003 | Kalm ..................... | B65G 13/11 193/35 R |
| 7,909,153 | B2 * | 3/2011 | Pogue ..................... | B65G 21/14 198/312 |
| 8,033,390 | B2 * | 10/2011 | Nakagawa ............. | B65G 17/38 198/851 |
| 9,783,093 | B1 * | 10/2017 | Esch ........................ | B60P 1/36 |
| 10,112,775 | B2 * | 10/2018 | Hanel ..................... | B65G 15/08 |

\* cited by examiner

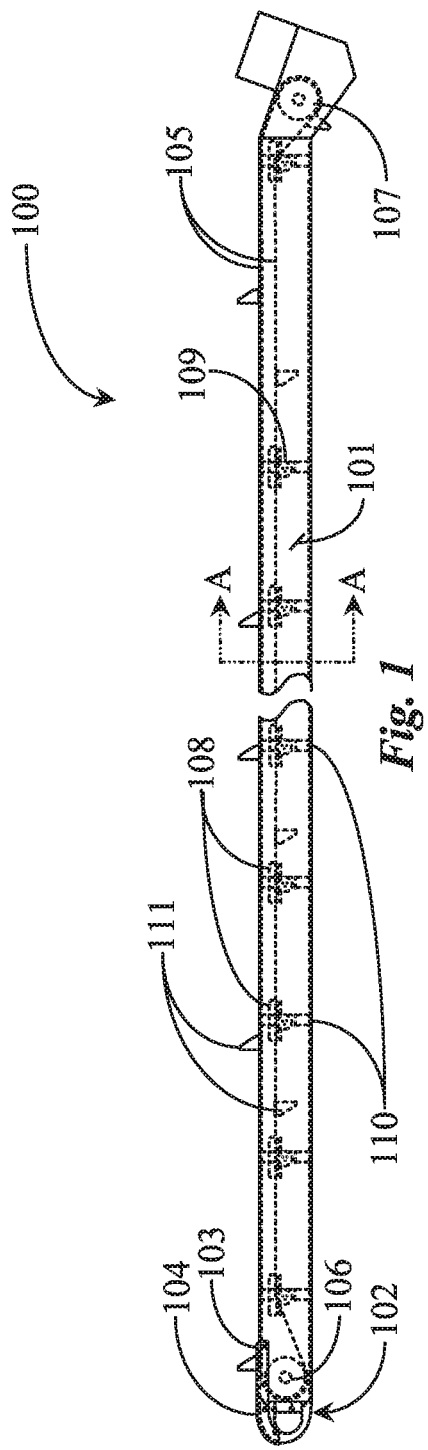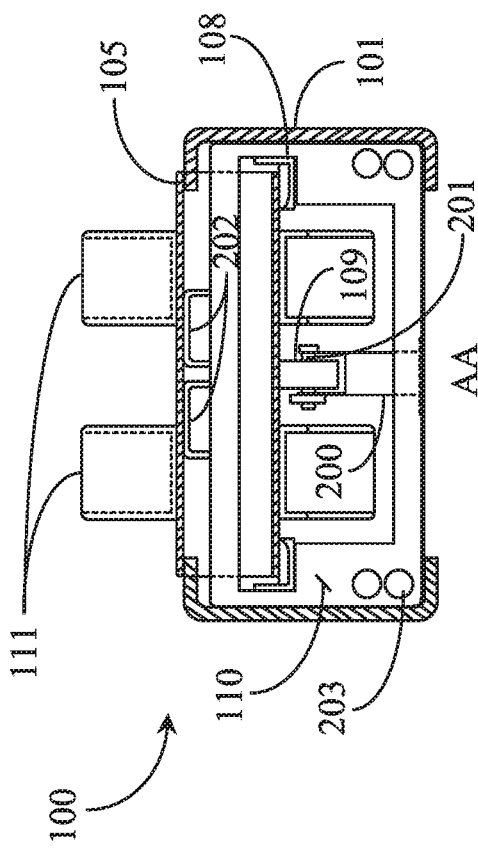

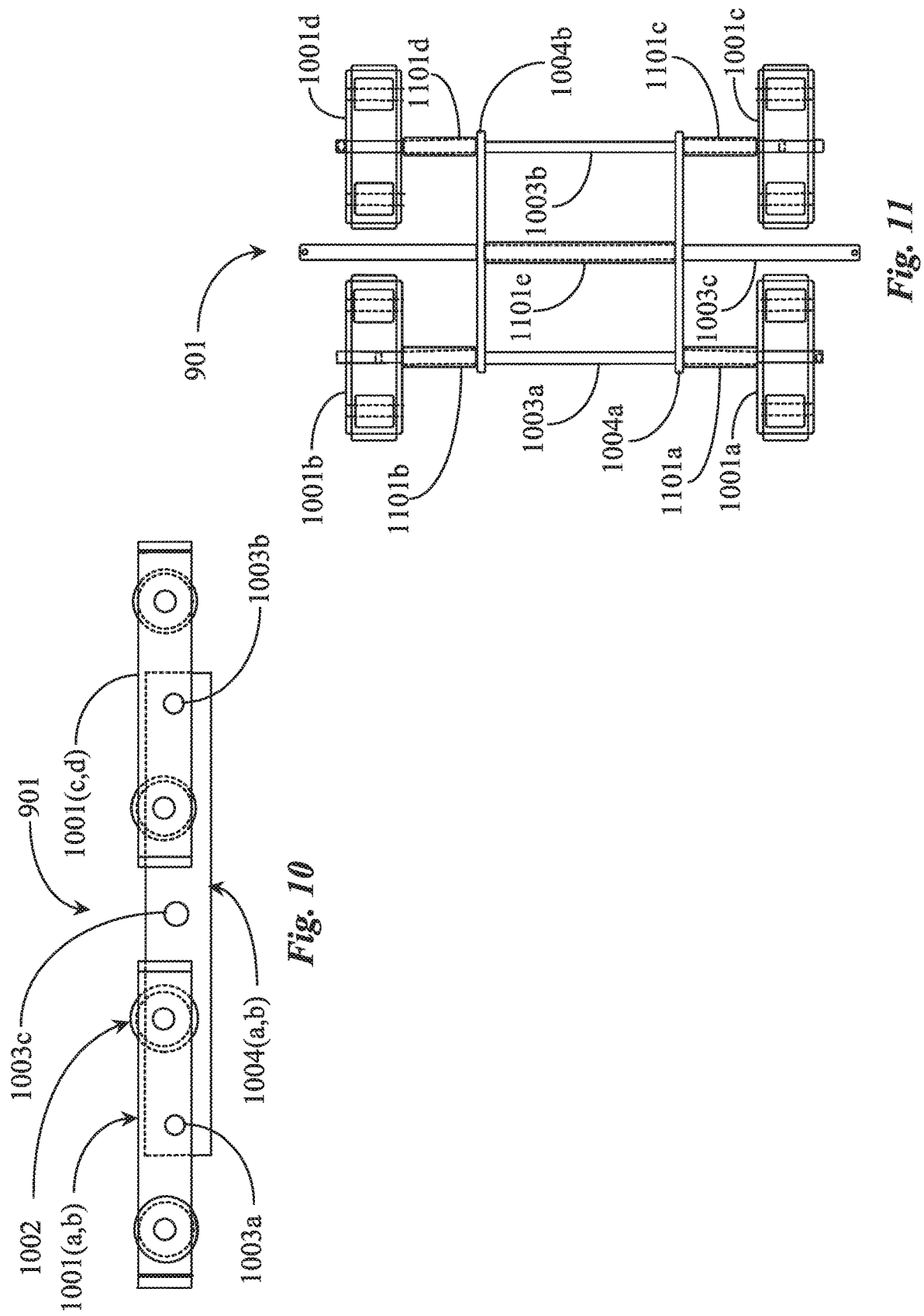

Detail B

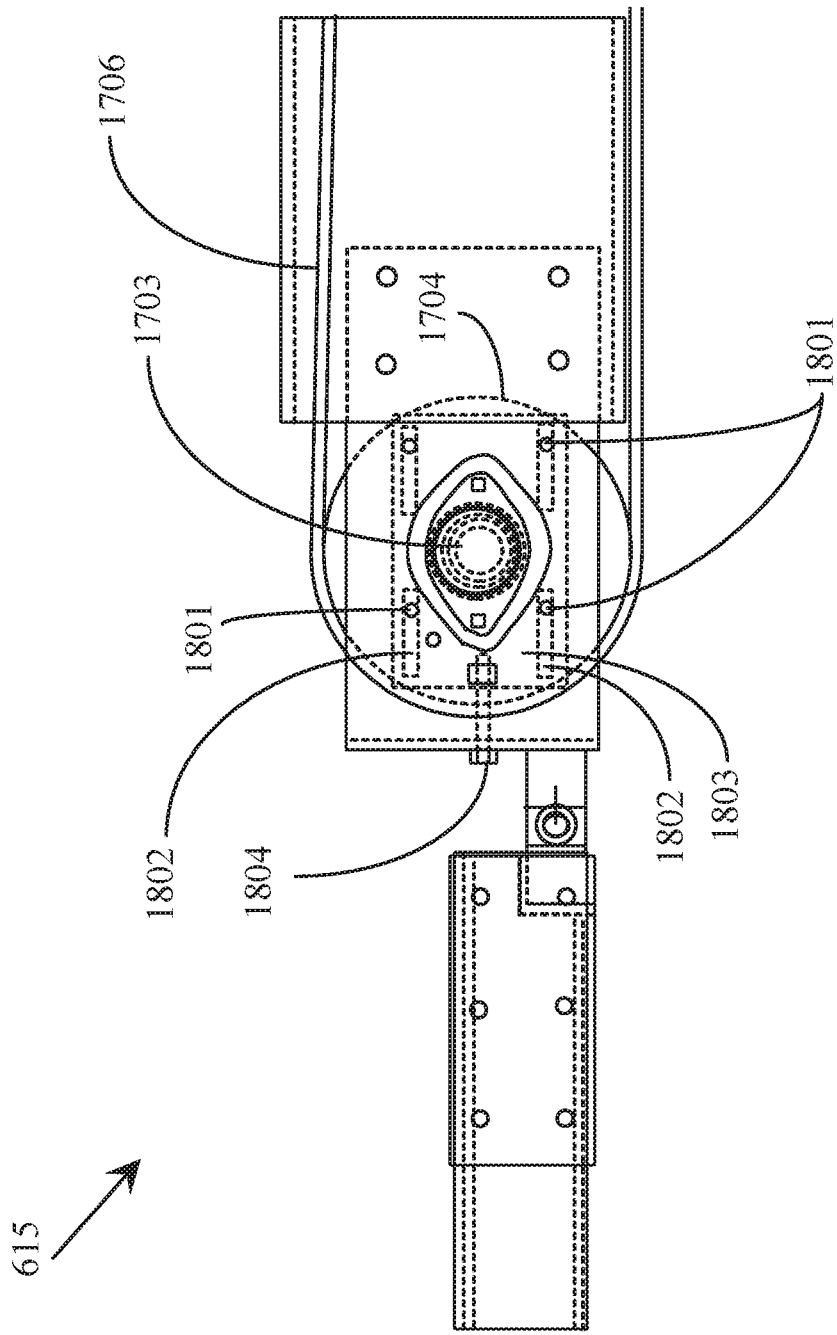

Section D-D

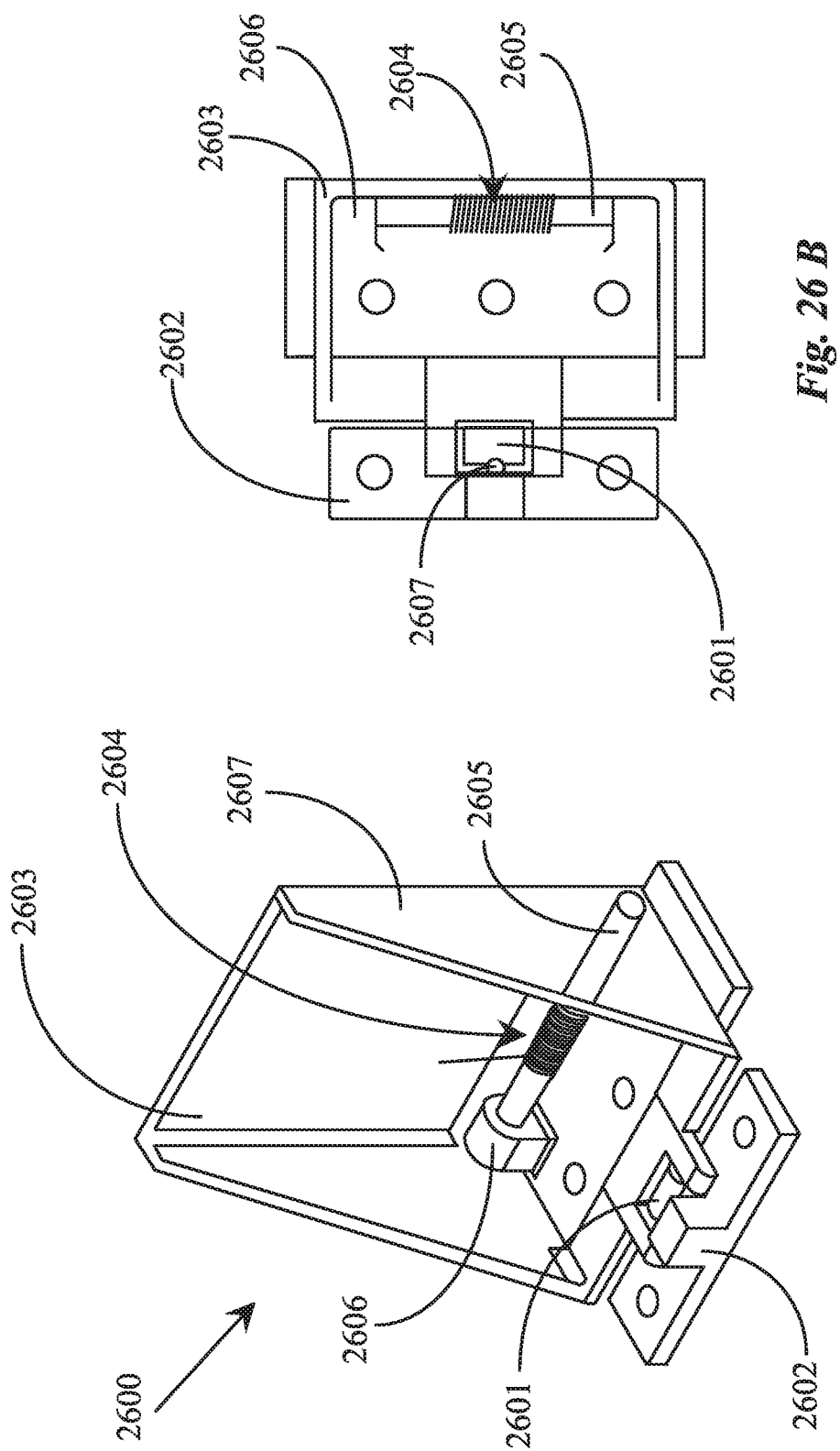

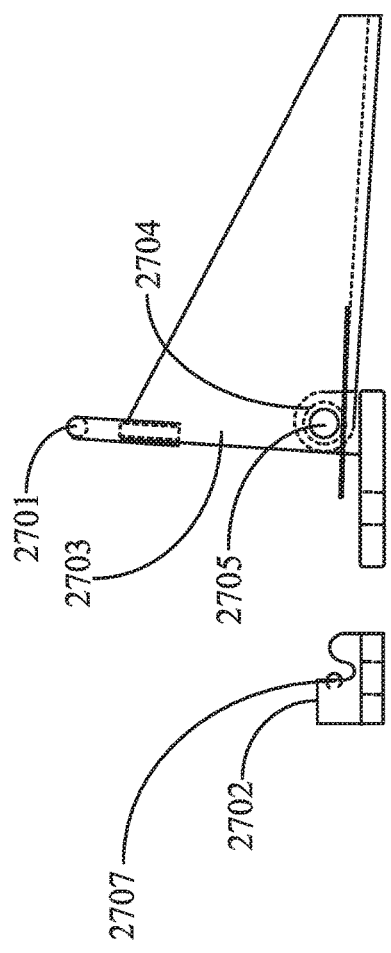
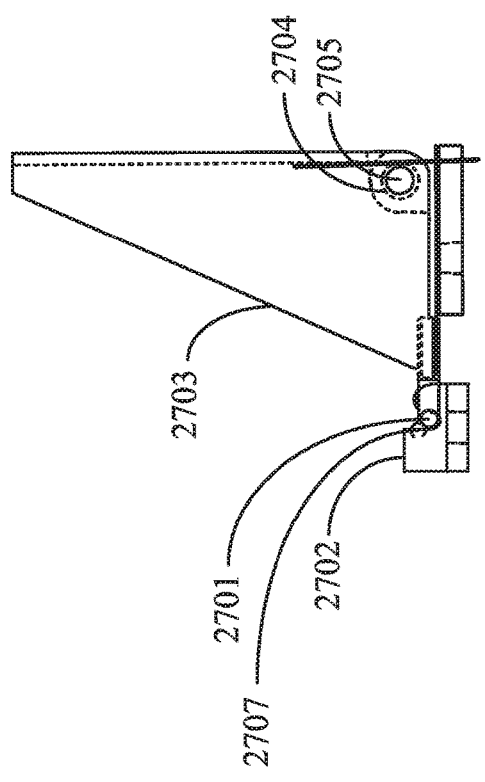

TELESCOPIC MATERIAL CONVEYER APPARATUS

CROSS-REFERENCE TO RELATED DOCUMENTS

The present invention is a continuation in part CIP of U.S. patent application Ser. No. 15/370,819, entitled "CONVEYER APPARATUS" filed on Dec. 6, 2016, which is a divisional of U.S. patent application Ser. No. 14/985,227 filed on Dec. 30, 2015. The disclosures of the above patent applications are included herein in their entirety at least by reference.

BACKGROUND OF THE INVENTION

1. Field of the Invention

The present invention is in the field of construction and pertains particularly to methods and apparatus for safely conveying materials to and from a rooftop.

2. Discussion of the State of the Art

In the field of construction equipment, more particularly in the roofing industry, roofing materials have traditionally been carried or lifted onto a roof top manually by the workers without any mechanical assistance other than a ladder. This caused injuries to workers.

Another problem in the art is that customers want to be able to transfer materials to a least a 50' foot height and be able to do that in tight and congested areas where their buildings were located. The longest boom the applicant was able to make for its conveyor was 28'. If materials needed to go higher typically a crane was used. Cranes are very expensive to operate and require a more highly skilled staff to operate as opposed to a conveyor. The inventors built several 40' conveyors which had to be mounted on semi trailers which are very hard to maneuver in tight and congested areas and therefore the answer to the problem has not yet been addressed.

The perfect truck size for the types of areas that these conveyors were needed is a 24' to 26' foot bed length. What was clearly needed to solve the customer's desire for a 50' reach that can be operated in congested areas was a new and innovative telescoping conveyor that could be mounted on a 24' to 26' truck bed.

More recently, conveyor type systems including those that are hydraulically powered have been developed and used to convey heavy roofing materials such as roofing shingles for example from a ground location to a rooftop location where those materials will be applied in construction.

One such system is known to the inventor and is included herein at least by reference to U.S. Pat. No. 5,984,077 granted for a mobile overhead conveyor system. This system as known to the inventor may be referred to herein as Frye et al. The system of Frye et al is installed on a delivery truck that may deliver materials to a roofing construction site. The system comprises a rotary turret type base that supports, via a lift mechanism, a boom including a conveyor that can be operated under hydraulic power and positioned at an azimuth sufficient to convey roofing materials from the truck directly to a roof top or from the rooftop back to the truck.

This system includes a feature that aids in the safety of operators and workers where electrical hazards exist such as nearby power lines or close electrical storm in that the main components of the boom, more particularly the side rails of the boom structure are fabricated from a non-conductive material such as fiberglass reinforced plastic beams. Also in this system, the conveyor belt is fabricated of a resilient polypropylene material.

It is critical that regular maintenance is conducted on a boom assisted conveyor such as the one referenced above due in part to complexity of operation of the hydraulic components and controls for raising lowering and positioning the boom for materials delivery and return from a rooftop. Forces acting against such a conveyor include a large weight factor associated with moving heavy roofing materials up the conveyor and onto the roof. An operator on the roof may control the conveyor belt drive mechanism via a motor control unit made available at the roof end of the boom structure.

Such heavy material loads on the conveyor may cause friction wear to components disposed at the upper end of the boom structure when the material is offloaded while the conveyor is running. This causes the wearing off of protective non-conductive coatings applied to certain components of the system of Frye et al, such components including metal such as the conveyor lugs, certain drive components (chain, sprocket), and other structural belt support components. The system of Frye et al builds up static electric charge resulting from continued operation in ferrying materials to and off of the rooftop. The above system is liable to produce a static shock during operation of the conveyor to move materials, such shock released when operators come to close to a worn portion of the boom structure or to any of the above mentioned components.

The inventor is aware of a conveyer system as referenced in the cross-reference section of this application. In use of lighter weight materials that may also flex under load, the inventors have determined that more improvement is required to maintain non-conductivity of the conveyer while enabling the conveyer to support more weight while in a state of operation.

Therefore, what is clearly needed is a conveyor system adaptable to a truck-mounted hydraulic turret and boom structure that eliminates or greatly reduces the problems described above and enables safer operation under heavy material load.

BRIEF SUMMARY OF THE INVENTION

A telescopic material conveyer apparatus is provided and includes a main boom assembly reinforced by a steel saddle frame connected to a turn table and a lift mechanism, an extension boom assembly adapted by two or more roller assemblies and connecting hardware to travel mechanically within the main boom assembly and to extend therefrom, travel caused by one or more connected drive motors, a conveyer belt supported by frame architecture and a supporting pulley and drive chain system, the conveyer belt surface extending along the top surface of the main and extension booms, at least one hydraulic motor having operative connection to the turntable, lift mechanism, and to a belt drive drum connected inline in the pulley and drive chain system, and at least one hydraulic valve connected inline in the hydraulic line controlling the belt drive motor, the valve electronically operable via input received from a load sensor integrated within or to the lift mechanism, a programmable load threshold determining open and close operation states of the valve, in turn, directing run and stop state operations of the conveyer belt.

In one embodiment, the connecting hardware includes a push bar assembly of two elongate and parallel bars held in position by one or more cross frame members, wherein one or both push bars of the assembly are connected to one or more than one drive chain and sprocket the drive chain caused to advance or retard via one or more chain-drive gears having connection to a matching gear or gears on the hydraulic motor. In one embodiment, the roller assemblies include an upper rear roller assembly and a lower front roller assembly, both assemblies in contact with the extension boom, the roller assemblies each including two or more pivot axles for enabling the individual rollers or roller sets to adopt position to conform to load pressure and load balance differences exerted on the extension boom.

In one embodiment, the pulley and chain drive system includes two main pulleys, the belt drive drum strategically located there between, the belt drive drum including a local drive chain and sprocket, the local drive chain connected to a sprocket on the drum and to a sprocket on the hydraulic motor. In one embodiment, the material conveyer apparatus further includes a pass through drum having two or more rollers for supporting the conveyer belt, the rollers strategically spaced apart to allow room for material cleats installed on the conveyer belt to pass through above and below at least one roller axle without making contact with the axle or other structural elements of the conveyer system.

In one embodiment, the material conveyer apparatus further includes at least two non-conductive wear rails located on opposing sides of the main and extension booms where the belt is exposed and extending the length of the belts upper travel path, the upper portions of those rails protecting the upper surface of the main and extension booms from friction wear caused by the belt and materials loaded on the conveyer belt. In a variation of this embodiment, the wear rails are mounted at one edge to a plurality of cross members of the main extension boom and wherein the rails are formed to rise vertically and then extend horizontally from the inside edge over the top surfaces and at least partly down the outer side of the boom housing just above the cross members.

In one embodiment, the safety valve is electronically connected to the load sensor integrated with the lift mechanism. In one embodiment, the material conveyer apparatus further includes a boom support leg having an interfacing foot that rests on the rooftop, the support leg reducing load pressure on the lift cylinder. In one embodiment, the main boom tapers down at the rear by approximately 15 degrees off of horizontal reducing the vertical height requirement for loading materials on the material conveyer apparatus. In one embodiment, a remote control is provided for starting and stopping the conveyer belt, the remote control integrated in operation with the at least one hydraulic safety valve and associated load sensor, the remote becoming non-operational to start the conveyer belt if it is stopped due to load sensor data.

BRIEF DESCRIPTION OF THE SEVERAL VIEWS OF THE DRAWINGS

FIG. 1 is a side elevation view of a conveyor apparatus according to one preferred embodiment of the present invention.

FIG. 2 is a section view of the conveyor apparatus of FIG. 1 taken along the section lines AA.

FIG. 10 is a side elevation view of a top rear roller assembly of the conveyor system of FIG. 9.

FIG. 11 is a top view of the upper rear roller system of FIG. 10.

FIG. 18B is an exploded side-elevation view of detail B of FIG. 6 depicting the pass through drum of FIG. 16 according to another embodiment of the present invention

FIG. 26A is a perspective view of a folding cleat according to one embodiment of the present invention.

FIG. 26B is a top view of a folding cleat according to one embodiment of the present invention.

FIG. 27A is a side view of a folding cleat or material stop in the folded down and shortened position.

FIG. 27B is a side view of a folding cleat or material stop in the upright tall position.

DETAILED DESCRIPTION OF THE INVENTION

Figure 3:
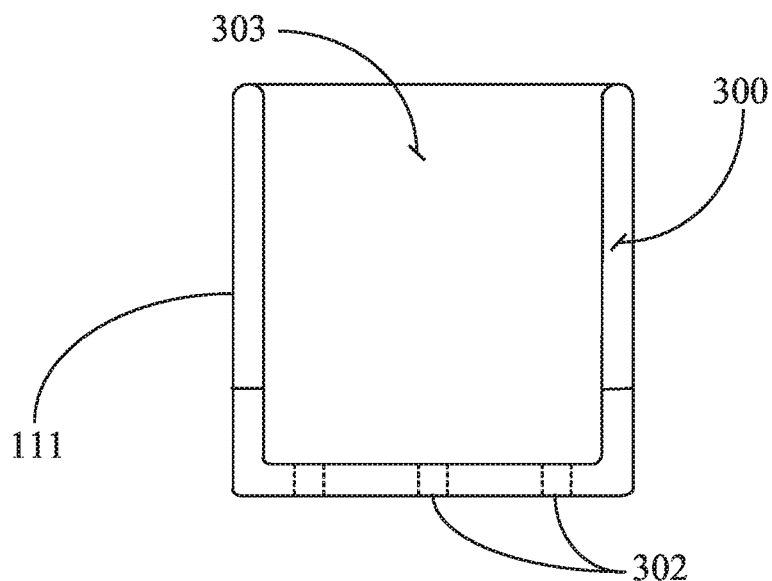
FIG. 3 is a front elevation view of the material stop of FIG. 2.

In various embodiments described in enabling detail herein, the inventors provide a relatively frictionless substantially nonconductive conveyor apparatus adaptable to a hydraulically-operated boom structure that reduces static buildup of electricity during conveyor operation and reduces frictional wear on one or more components of the conveyor apparatus including the conveyor belt. The present invention is described in enabling detail using the following examples, which may describe more than one relevant embodiment falling within the scope of the present invention.

FIG. 1 is a side elevation view of conveyor apparatus 100 according to an embodiment of the present invention. Conveyor apparatus 100 is adapted as a hydraulically powered conveyor belt 105 supported at both ends by roller assemblies 106 and 107 and by a hydraulically powered boom assembly constructed of substantially parallel side rails 101 held together by a plurality of structural cross frame members 110 disposed at spaced intervals (may be equally spaced) over the length of the boom. Boom rails 101 may be manufactured of fiberglass reinforced plastic or other non-conductive materials. Cross frame members 110 form rectangular framing members having a partially open back, a bottom, a top and two sides forming a box like structure. In a preferred embodiment, cross frame members 110 are manufactured of durable steel frames that may be formed. Other durable materials may also be used in place of steel without departing from the spirit and scope of the present invention, such as fiberglass, Delron material or other non-conductive materials.

Side rails 101 may be bolted to or otherwise attached to cross frame members 110 to create a "boom housing" supporting conveyor apparatus components. Longitudinal bottom rails may also be provided and used to tie in the cross frame members at the bottom of the boom structure in one embodiment, for added support. Conveyor apparatus 100 includes a pair of nose loop assemblies 102 attached at one end of the boom rail structure with one loop assembly per side. Nose loop assemblies 102 are attached to the end of the boom structure that rests on a rooftop. The opposite end of the conveyor apparatus includes hardware for lift and vehicle turret mounting (not specifically illustrated). Lifts and lift support structures are not illustrated to improve clarity of the illustration.

Nose loop assemblies 102 include a nose loop 103 and a wear plate assembly 104. Nose loop 103 may be manufactured of fiberglass or another durable electrically resistive material. Wear plate assembly 104 comprises two half pieces or components that are installed over the top of nose loop 103 from opposing sides to protect the upper surface of the nose loops from frictional wear or damage from materials coming off of the conveyor. Wear plate assembly 104 may be manufactured of Delron or another non-conductive material and may be fastened to nose loop 103 using standard nut and bolt hardware. It is noted herein that wear plate assembly 104 is modular and replaceable such that when it is worn down by frictional contact with materials it may be removed and replaced with a new assembly.

Conveyor apparatus 100 includes a first axially mounted roller assembly 106 disposed at one end and a second axially mounted roller assembly 107 disposed at the opposite end of the boom structure. A conveyor belt 105 fits over the roller assemblies. The conveyor belt may be adjusted relative to tight or loose tension over the rollers via a sliding plate-and-screw adjustment mechanism having mechanical connection to roller assembly 107 or the "lower pulley position". In one embodiment a roller assembly may include a plurality of axially mounted wheels that are fixed to the axle whereby the axle is driven under hydraulic power to turn the wheels. In this embodiment the non-powered roller assembly may include wheels that are freely rotable about a fixed axle.

In another embodiment there may be one or perhaps two elongated cylinders that may be axially mounted in place of multiple wheels. In this embodiment one or more cylinders may be grooved to reduce surface contact with the belt. In one embodiment rollers, whether cylinders or wheels are manufactured of Delron or another polymer having a high resistance property to electrical conduction. In another variation of this embodiment the edges of the cylinders may be raised somewhat to aid in capturing and retaining the conveyor belt. In yet another variation of the cylinder embodiment a single cylinder may be tapered down slightly from the edges to center, helping to center the belt, improving grip on the belt, and reducing slippage or jumping of the belt in operation.

Conveyor belt 105 has a plurality of material stops 111 strategically disposed on the outer surface of the belt. Material stops 111 may be distributed in pairs affixed to the belt at measured intervals along the entire circumference of the belt. Material stops 111 are aligned in pairs orthogonally to the direction of conveyor belt 105. Material stops 111 have an angular side profile and are hollow or open on one side with a vertical face two side walls and a bottom mounting surface. The vertical face interfaces with material placed on conveyor 100 preventing the material from sliding down when the conveyor is positioned at an angle for rooftop delivery of materials. In one embodiment material stops 111 are manufactured from Delron or another durable plastic with a high resistance to electric conduction.

Conveyor apparatus 100 includes a plurality of lower belt support wheels 109 disposed one per at each cross frame member 110 on the bottom upper surface thereof. Support wheels 109 may be manufactured of plastic having a high resistance to electrical conductivity. Support wheels 109 are axially mounted on support posts and may be freely rotable about their axis at an elevation above the bottom surface of the cross frame members sufficient to support the lower outer surface of conveyor belt 105.

Conveyor apparatus 100 includes a plurality of belt guide plates 108. Belt guide plates 108 are disposed in pairs at each cross frame member and are affixed to the cross frame members. Belt guide plates 108 include an elongate rectangular bottom plate and a vertical back plate. Guide plates 108 may be manufactured of Delron or another electrically resistive material. Belt guide plates include machined or molded features that reduce friction wear on the conveyor belt during operation. Moreover, guide plates 108 also conform to the natural sag or drop off in elevation of the lower portion of conveyor belt 105 as it travels through each cross frame member.

In one embodiment conveyor apparatus 100 includes a start and stop valve, lever, or other hydraulic control mechanism (not illustrated here) disposed near the upper or rooftop end of the boom structure proximal to nose loop assembly 102. Such a control mechanism enables an operator at the rooftop location to start and stop the conveyor. In one embodiment the general direction of the conveyor belt may also be reversed using the control mechanism at the rooftop or one provided at the turret end of the boom structure. In one embodiment there are two drive motors one at the open end of the boom structure to drive the conveyor belt, and one at the turret end of the boom structure for operating (push, pull) the extension boom, wherein when both motors may operate at the same time to extend the boom and drive the belt. Hydraulic hoses may be threaded through openings in the boom structure cross frame members and connected to a hydraulic drive motor at the upper end of the conveyor apparatus.

FIG. 2 is a section view of the conveyor apparatus of FIG. 1 taken along the section lines AA. Conveyor apparatus 100 is depicted in cross section for more clarity in illustration of the components. Side rails 101 are held together in parallel relationship by cross frame members 110. Guide plates 108 are affixed by screw, nut and bolt or by other fastening methods on opposing shelves of each cross frame member. Guide plates 108 may be manufactured from Delron which has a high resistance to electric conduction and a very low frictional property further protecting the conveyor belt from wear at the edges.

Guide plates 108 prevent the conveyor belt (105) edges from rubbing against the cross frame members. Radii at either end of the belt guide are provided to taper the thickness dimension of the bottom plate that the conveyor belt rides on during its passage back through the internal space of the boom structure. The radiused bottom plates act to reduce sharp or abrupt drop off of the belt at the edges of the guide plates the radii conforming to the natural sag or dip of the conveyor belt as it leaves the support of the guide plates and support wheels at each cross frame member along the length of the boom structure. Other radii are also provided to the guide plates at strategic points to prevent the conveyor belt from snagging onto any corners or sharp edges.

Support wheel 109 is axially mounted to a post 200 using a pin or dowel or other axle component 201. Post 200 may be manufactured of formed steel or another durable material. Post 200 may be bolted onto the bottom plate of cross frame member 110 and is disposed centrally as viewed in the cross section. In one embodiment there are openings 203 provided through cross member 110. Opening 203 may provide passage of hydraulic hosing through the boom structure and up to the nose of the conveyor apparatus where the drive motor for the conveyor is located. There may be one or more supply and return lines without departing from the spirit and scope of the present invention.

The back plate of cross frame member 110 is largely open in the central area in order to facilitate open space within the boom structure for the conveyor belt 105 including material stops 111 to pass through. The open space is sufficient that the material stops do not touch any other component of or part of the boom structure. Conveyor belt 105 rides on the upper surface of the boom structure and is supported proximal to the belts edges by boom side rails 101. In one embodiment upper support rails 202 may be provided and affixed to the top surface of each cross frame member 110. In this example a pair of rails 202 adjacent and strategically co located just on either side of the center of the conveyor apparatus. Support rails 202 may be fabricated of Delron or similar polymer material, or a fiberglass composite having a high resistance to electric conduction and a low friction point.

Support rails 202 are U-shaped parts for supporting the center of conveyor belt 105 at the top of the boom structure. The elevation of the support rails 202 significantly coincides with the horizontal plane of the top surface of the connected boom side rails. The lower end of conveyor belt 105 rides on guide plates 108 and is supported at substantial center by support wheels 109. In this sectional view, the material stops 111 on the top side of conveyor belt 105 are moving toward the viewer and present a flat vertical face (material interface) orthogonal to the top surface of the belt. The material stops 111 at the bottom of the conveyor belt are moving away from the viewer and present the open side of the material stop. The material stop side walls on the open end are angled back away from the viewer, in one embodiment, approximately 30 degrees decreasing weight on the belt and stress on the installation point or points relative to the attachment of the stop to the conveyor belt.

FIG. 3 is a front elevation view of material stop 111 of FIG. 2. Material stop 111 is open on one side and has a back wall 303, which is the opposite side of the material interface side (vertical wall). Material stop 111 has a plurality of openings 302 provided through the bottom plate or surface for accepting a fastener such as a bolt for example. In one embodiment material stop 111 is fastened to the conveyor belt using a back plate (not illustrated) on the underside of the conveyor belt, the back plate having openings in alignment with openings 302. In another embodiment there may be back washers and nuts used at each of the openings.

Material stop 111 includes opposing side walls 300, which may be angle back away from the viewer approximately 30 degrees beginning at a specific elevation as depicted by cut lines. The hollow interior, resultant of fabrication, reduces the weight of material stop 111. Material stop 111 may be manufactured entirely of Delron, which is a substantially nonconductive polymer (electrically resistive), thus having sufficient strength to support material weight being ferried up to a rooftop. Edges of material stop 111 may be radiused to remove any sharp corners or edges that might snag onto material during the process of loading and unloading material on the conveyor.

Figure 4:
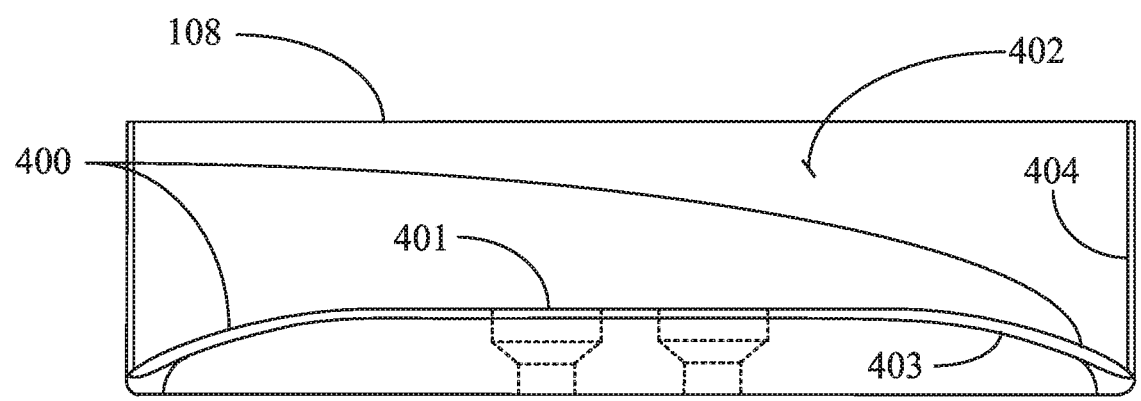
FIG. 4 is a front elevation view of the belt guide plate of FIG. 2

FIG. 4 is a front elevation view of the belt guide plate of FIG. 2. Belt guide plate 108 includes a unique design providing for less frictional contact with the conveyor belt and a reduced angle of shear at both ends of the bottom plate. Belt guide plate 108 includes a back riser plate 402 that may protect the edges of the conveyor belt from contacting cross frame components. Belt guide plate 108 may be made entirely of Delron combining polymer features of high resistivity to electrical conduction, structural rigidity and strength, and low coefficient of friction. Other material types such as Teflon for example are more abrasive to the conveyor belt.

Belt guide plate 108 includes a bottom plate top surface that is radiused to provide a taper (radii 400) at opposing edges of the plate toward center of the plate. Provision of such radii eliminates a sharp drop in elevation in conveyor belt (105) such as at drop off points and pick up points representing the edges of the guide plates. Cross frame members (110) hosting the belt guide plates are spaced strategically apart so the lower portion of the conveyor belt will sag somewhat even with the correct amount of tension in the belt.

Radii 400 conform to the natural drop off profile of the conveyor belt. The long edges of the bottom plate are also radiused to eliminate snagging and wear on the belt via a sharp edge. Referring now back to FIG. 2, the front corners of guide plate 108 are radiused to reduce contact with conveyor belt 105.

Referring now to FIG. 4, belt guide plate 108 includes counter-bored openings 401 provided through the bottom plate. Openings 402 accept mounting screws or bolts for mounting the plate onto opposing shelves of the cross frame members (110). Back plate 402 extends vertically a sufficient height to help insure that the belt does not touch any frame members even at lower belt tensions that may be too low for safe or proper operation.

In one embodiment back riser plate 402 maybe angled inward by a strategic amount sufficient to aid in urging the edges of the lower portion of the conveyor belt down restricting it to the surface area of the guide plates. In one embodiment the angle may be machined into the back riser plate or molded as such without departing from the spirit and scope of the present invention. Belt guide plates 108 aid in keeping material stops in the correct open passage way through the boom structure as viewed in FIG. 2 preventing the stops from making any contact with frame members or other components.

Figure 5:
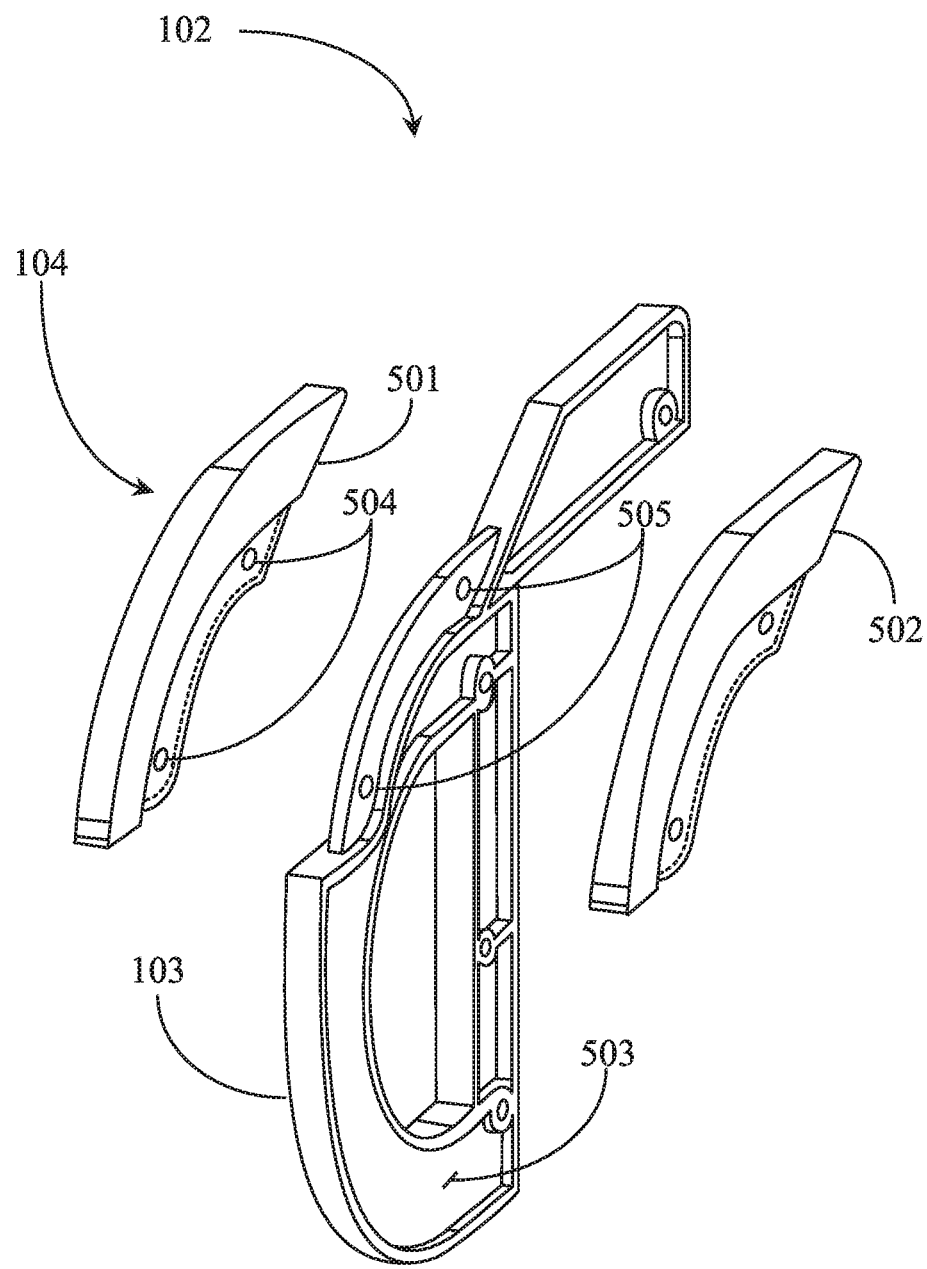
FIG. 5 is a perspective assembly view of a nose guard and wear plate assembly according to an embodiment of the present invention.

FIG. 5 is a perspective assembly view of nose loop assembly 102 according to an embodiment of the present intention. Nose loop assembly 102 includes a nose loop 103 and a wear plate assembly 104. Nose loop 103 may be affixed to the upper end of the boom structure at the side rails. There are two such nose loops provided one affixed proximal to the end of each boom rail. Nose loop 103 may be manufactured of Delron, another non-conductive polymer, fiberglass composite or another durable electrically resistive material. Wear plate assembly 104 comprises two half pieces 501 and 502 that are installed over the top of nose loop 103 from opposing sides to protect the upper surface of the nose loop from frictional wear or damage from materials coming off of the conveyor. Wear plate assembly 104 may be manufactured of ultrahigh molecular weight (UHMW) polyethylene. Wear plate assembly 104 may be fastened to nose loop 103 using standard nut and bolt hardware through openings 504 and openings 505 on nose loop 103.

Nose loop 103 has a recessed surface 503 at both sides to achieve lighter weight without compromising structural integrity of the loop. Wear plate components 501 and 502 are identical parts and can be swapped in assembly. Wear plate assembly 104 provides a function protecting nose loop 103 from excessive wear and a function insulating an operator from sudden static shock that may build up while the conveyor is continually operated. Such a static electric shock may be powerful enough to distract an operator enough to cause serious injury.

Wear plate components 501 and 502 may be manufactured entirely of Delron. Wear plate assembly 104 is replaceable if it becomes worn through frictional contact with materials being loaded or off loaded from the conveyor. Each wear plate component 501 and 502 has a double walled lower portion through which openings 504 are placed through (both walls). The inner edge of the nearest wall in perspective view is depicted herein with a broken edge line. Wear plate assembly 104 is installed over nose loop 103 where openings 505 are provided through a "rib" portion of the nose loop having the same thickness as recessed wall 503.

It will be apparent to one with skill in the art that the conveyor apparatus of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

TELESCOPIC BOOM SYSTEM

The inventors provide a telescopic conveyer apparatus having a unique telescopic boom system including supporting features and components of which are described in enabling detail relative to the examples below which may represent more than one possible embodiment of the present invention.

Figure 6:
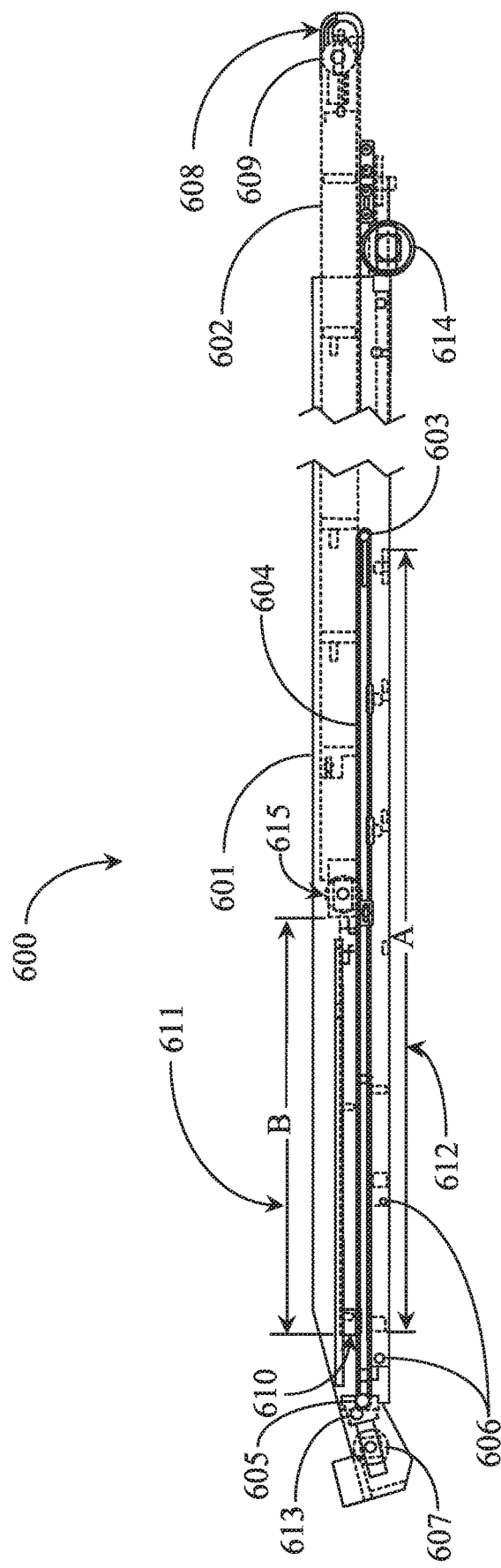
FIG. 6 is a side elevation view of a telescopic boom type conveyor system according to one preferred embodiment of the present invention.

FIG. 6 is a side elevation view of a telescopic boom type conveyor system 600 according to an embodiment of the present invention. Telescopic conveyer system 600 is adapted to be mounted on to a vehicle mounted turntable (not illustrated) by way of a steel saddle frame 612 that is contained within a main conveyer boom 601. Dimension A associated with element number 612 indicates the span of the saddle frame along main conveyer boom 601. Dimension A is approximately 15 feet in length, though it may be somewhat shorter or longer than 15 feet without departing from the spirit and scope of the present invention.

Main boom 601 is constructed using elongate side rails held in place by a plurality of structural cross frame members forming a boom housing that has sufficient room for containment of an extension boom 602. Like main boom 601, extension boom 602 includes elongate side rails and structural cross members that may be manufactured of formed steel frames that do not inhibit the non-conductivity of the boom or overall conveyor apparatus. Main boom 601 and extension boom 602 are connected together in a telescopic manner to enable the extension boom to travel mechanically within the main boom and to be extended out from the main boom. Both the main boom and extension boom may be constructed largely of non-conductive composite materials. Saddle frame 612 may be mounted to a turntable at connection points 606 at opposing sides of the frame.

A unique push bar assembly 611 is provided in this embodiment and is connected to main boom 601 and to extension boom 602. Push-bar assembly 611 spans a dimension B that is approximately half of the distance of saddle frame 612. Push bar assembly 611 includes, in this example, two elongate push bars held substantially parallel and in the same plane by two or more cross members. Push bar assembly 611 is chain driven and therefor it is connected to a chain-drive apparatus via connection hardware 610 that includes a drive chain 604 installed on a sprocket pulley system featuring a front idler sprocket 603 and a rear drive sprocket 605 including a drive gear (not illustrated) that matches a drive gear 613 at the hydraulic motor. In this example there are two drive chains and pulley sets driving push bar assembly 611 on either side of saddle frame 612.

In this example, a drive drum 614 is provided to drive the conveyor belt (not illustrated). At the front of the extension boom 602 are nose loop assemblies 608 and an idler pulley 609. Idler pulleys 607 support the conveyer belt at the rear of conveyer 600. Dimension B depicts the approximate length of the push bar apparatus, in this embodiment approximately half of the distance A of saddle frame 612. The push bars may be fabricated of any non-conductive materials including fiberglass composite material and are lighter in weight than other materials reducing overall weight of the conveyer apparatus. Pass through drum 615 is provided to support the conveyer belt at the rear end of extension boom 602. Pass through drum 615 is configured architecturally to support the conveyer belt and allow material stops or cleats installed on the conveyer belt (belt and cleats not illustrated) to pass through the structure without coming in contact with structural or mechanical parts of the conveyer system.

In general operation of telescopic conveyer apparatus 600, the main boom is lifted and swiveled into position to be bridged to a roof top for example for the purpose of conveying materials from a truck onto the supporting roof. Extension boom 602 may be mechanically extended from within boom 601 using the push bar system to push and pull on the extension boom. Roller sets (not illustrated) are provided to make the travel of the extension boom smooth. The push bar system extends past the saddle frame when the extension boom is extended fully creating a non-conductive break point in the boom structure.

Figure 7:
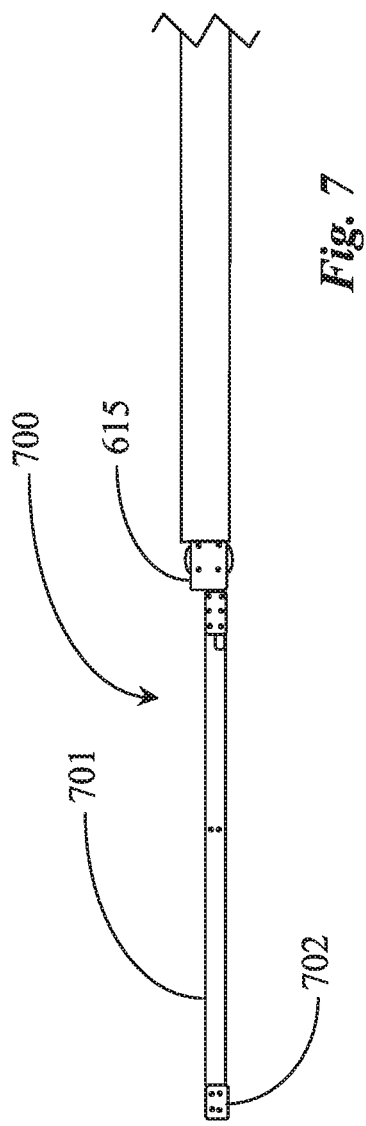
FIG. 7 is a side elevation view of a boom push rod assembly connected to an extension boom of the conveyer system of FIG. 6.

FIG. 7 is a side elevation view of a boom push rod assembly 700 connected to the main and extension booms of the conveyer system of FIG. 6. Extension boom 602 includes nose loop assemblies 608 at one end and the push bar system and connection point interfaces 702 (two each) at the opposing end for attaching to the drive chains (drive chains not illustrated). The push bar assembly is connected to extension boom 602 at the rear of the boom or to the pass through drum 615. In one embodiment the push bar assembly is connected to the extension boom using a pin-clevis attachment, allowing the connection point to pivot.

Figure 8:
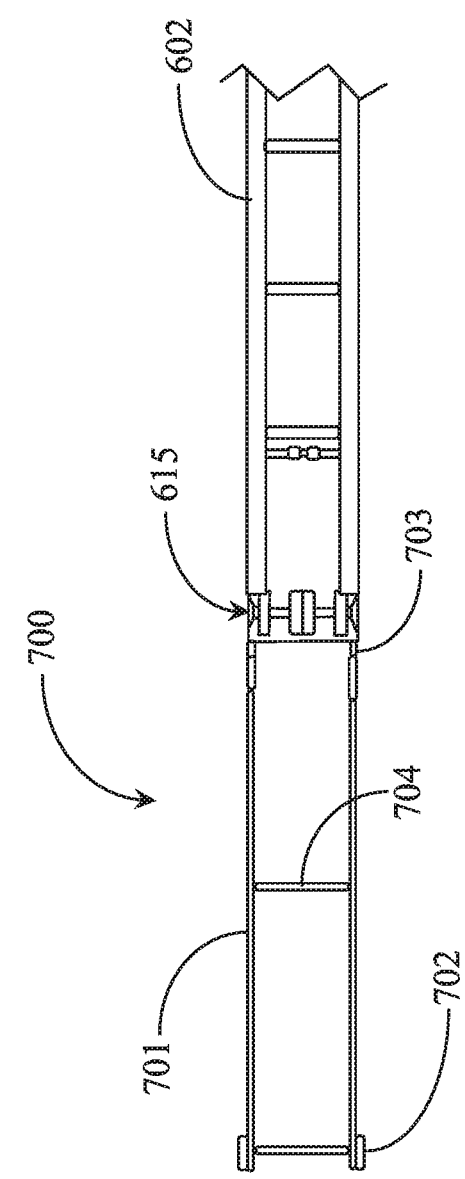
FIG. 8 is a top view of the push rod assembly and extension boom of FIG. 7.

FIG. 8 is a top view of push bar assembly 700 and extension boom 602 of FIG. 7. Push bar assembly 700 includes parallel push bars 701 held apart and parallel by cross members 704. The entire push bar assembly except for the steel cross members may be fabricated of non-conductive composite materials as previously described above. Interface 702 connects to the drive chains (not illustrated) at each opposing side of the saddle as described further above in FIG. 6.

Figure 9:
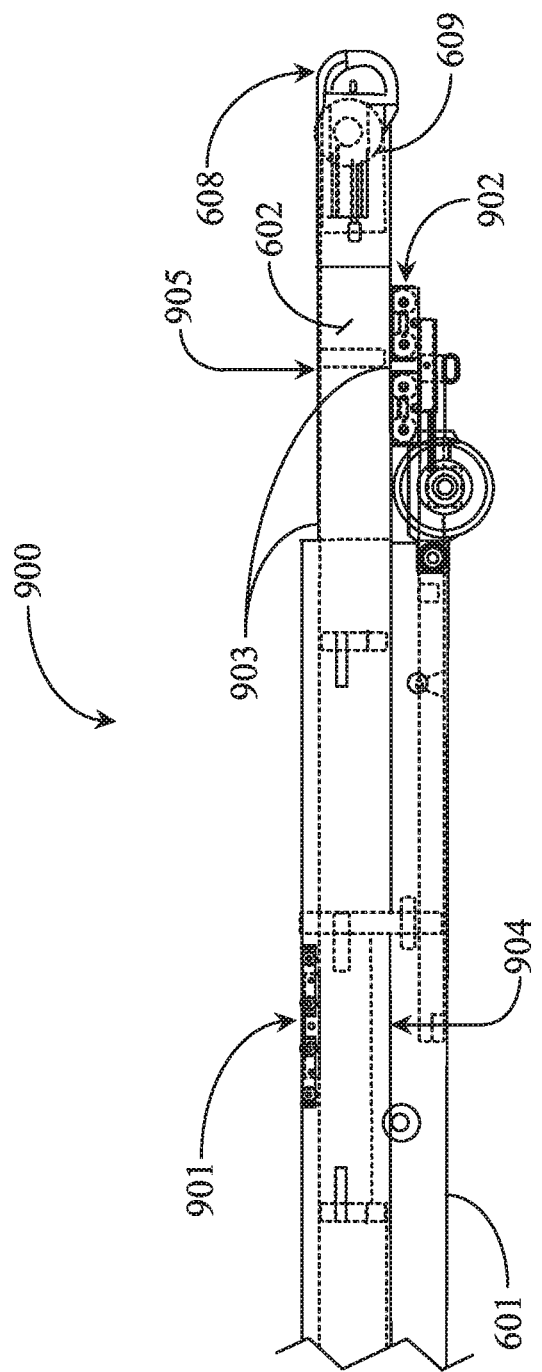
FIG. 9 is a partial side elevation view of the main and extension booms of the telescopic conveyer system of FIG. 6.

FIG. 9 is a partial side-elevation view of the main and extension booms of telescopic conveyer system 600 of FIG. 6. Conveyer 600 includes a top rear roller assembly 901 that is mounted within the main boom and wherein a plurality of rollers, in this example, eight rollers make contact with the fiberglass rails 903 defining the top surface of boom 602. Conveyor 600 includes a front bottom roller assembly 902 that is mounted on a structural frame member beneath or just below the bottom fiberglass rails 903 and wherein the individual rollers (eight rollers) make contact with the rails defining the bottom surface of extension boom 602.

Roller assembly 901 and roller assembly 902 both function to make travel by the extension boom smooth and kink free despite differing angles of the conveyer boom assembly and unbalanced loads exerted on the conveyor system. Roller assembly 901 includes at least three pivot points that allow the rollers to conform with flex attributed to the fiberglass rails. Likewise, roller assembly 902 includes at least three pivot points enabling the rollers to conform to flex in the fiberglass rails it makes contact with beneath the extension boom.

The act of extending extension boom 602 out from within main boom 601 may cause load pressure specifically at load points 904 and 905, which are magnified with a full material load. The flexibility of each of the roller assemblies helps to prevent slippage, binding and functions to enable maximum roller contact with the extension boom even under conditions where the boom rails are bowed or otherwise not completely planar. Although not illustrated here, nose loop assembly 608 may be kept off of a roof top via a support leg affixed to the boom generally underneath and just behind forward pulley 609. More detail about supporting extension boom 602 on a roof top via a support leg is provided later in this specification including its relevancy to high material load mitigation when operating the conveyer system.

Conformity to natural flex and flex under load of materials is afforded by roller assemblies 901 and 902 operating in contact with the non-conductive fiberglass top and bottom rails of the extension boom overcoming current limitations of fabrication such as using solid steel components which also add much more weight to the conveyor, undermine its non-conductive properties, and limit its general usefulness and length of reach of the system as a whole. In addition, a spread load on the fiberglass frame afforded by the roller assemblies increases the life and boosts the safety factors of the fiberglass. Extension boom 602 may be extended using only a minimal amount of force largely due to ball beatings in the rollers. This extends the life of components affected by extending and retracting the extension boom such as sprockets, chains, fasteners, shafts, fiberglass rails, and so on.

All metal parts such as the chains incorporated in this invented mechanism, in its various functions, may be made entirely of non-conductive or poorly conductive metal alloys or plastic.

Figure 28:
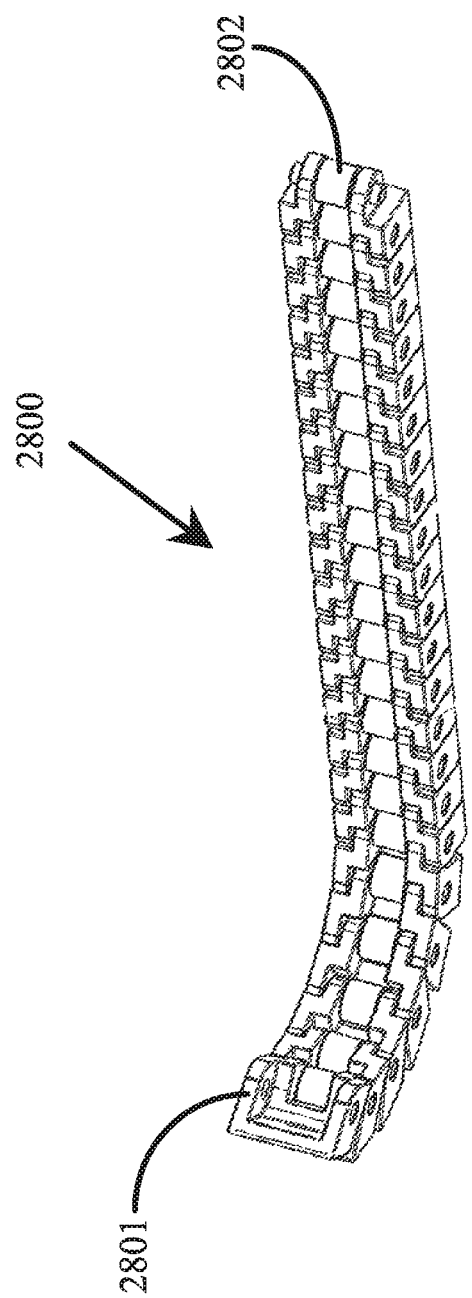
FIG. 28 is a perspective view of a special chain made from a variety of high tech materials.

FIG. 28 illustrates such a chain. Chain 2800 has a frame 2801 made of non-conductive materials and the roller portions 2802 are constructed of non-conductive materials as well. These parts may be made of high impact polymer plastics impregnated with glass fibers, carbon fibers, carbon nanotubes, glass beads or any other reinforcing or strengthening materials added to plastics to increase strength and or high wear characteristics. In one embodiment the chain is made from a material, polybenzimidazole (PBI) or poly-2, 2'-(m-phenylene)-5,5'-bibenzimidazole, marketed as a bulk polymer under the trade name Celazole. It is commonly reported to have the highest compressive strength of any unfilled plastic material, and has the highest tensile strength, highest shear strength, and highest Rockwell hardness rating of any plastic available. It maintains its mechanical properties at high temperatures better than any other unreinforced polymer, and can reportedly survive short-term exposure to 1400° F., which is 200° above the melting point of aluminum.

FIG. 10 is a side elevation view of a top rear roller assembly of conveyor system 600 of FIG. 9. Roller assembly 901 includes eight rollers 1002 arranged in opposing rectangular roller set frames 1001 (a,b) and 1001 (c,d). Roller set frames 1001 (a, b, c, and d) each are rectangular frames having a front and back wall and end walls. Roller set frames may be fabricated of durable steel capable of withstanding pressures subjected to the assembly in operation. Roller set frames 1001a and 1001b are arranged on opposite sides and are pivotally mounted onto a pivot axle 1003a Likewise, roller set frames 1001c and 1001d are so arranged and pivotally mounted onto a pivot axle 1003 b. Pivot axles 1003a and 1003b also support roller set spacer plates 1004a and 1004b. Spacer plates separate a number of cylindrical spacers (not illustrated here) that retain the roller set frames 1001a through 1001d in position on opposite sides of the extension boom.

Each roller set frame carries two rollers axially pinned on either side of the pivot axle. Roller assembly 901 is mounted within the main boom via a central pivot axle 1003c that may be affixed to frame members or to structural components within the main boom. Rollers 1002 make contact with at least the fiberglass rails of the extension boom as it is pushed and pulled within the main boom. Roller assembly 901 has three pivot points. Roller set frames 1001a and 1001b may pivot about pivot axle 1003a while roller set frame 1001 *c* and roller set frame 1001*d* may pivot about pivot axle 1003*b*. Roller assembly 901 may pivot about central pivot axle 1003*c*.

FIG. 11 is a top view of upper rear roller assembly 901 of FIG. 10. Cylindrical spacers are used to space components in roller assembly 901 apart from one another. Cylindrical spacers 1101*a* and 1101*b* retain rollers sets toward the ends of pivot axle 1003*a*. Retaining clips or pins may be employed to prevent rollers from coming off of the supporting pivot axle. Spacer plates 1004*a* and 1004*b* abut against cylindrical spacers 1101*a* through 1101*d*. A central cylindrical spacer 1101*c* is provided to space plates 1004*a* and 1004*b* apart. Central and roller set spacer components may be manufactured from non-conductive materials or composite materials. Central pivot axle 1003 has a mounting opening at either end of the axle for facilitating mounting within the main boom. Rollers 1002 may be rated in hardness (durometer) whereby the rollers may give way to flattening somewhat to aid in spreading out the load of the weight presented on the assembly.

Figure 12:
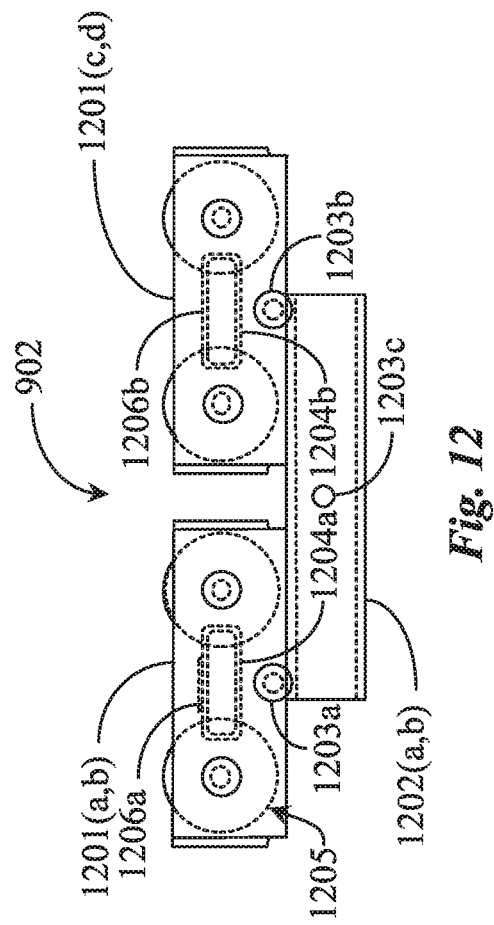
FIG. 12 is a side elevation view of the lower front roller assembly of FIG. 10.

FIG. 12 is a side elevation view of lower front roller assembly 902 of FIG. 9 Like roller assembly 901, roller assembly 902 includes at least three pivot axles. Roller assembly 902 includes eight rollers 1205 arranged in opposing rectangular roller set frames 1201(*a, b*) and 1201 (*c, d*). Rollers 1205 may be rated in hardness (durometer) whereby the rollers may give way to flattening somewhat to aid in spreading out the load of the weight presented on the assembly. Roller set frames 1201 (*a, b, c, d*) each are rectangular frames having a front and back wall and end walls. Roller set frames may be fabricated of steel for strength. Roller set frames 1201*a* and 1201*b* are arranged on opposite sides and are spaced apart by a somewhat flexible cross member 1206*a*. Likewise, roller set frames 1201*c* and 1201*d* are so arranged and are spaced apart by a somewhat flexible cross member 1206*b*.

Roller set frames 1201*a* and 1201*b* are pivotally mounted on a pivot axle 1203*a* as a relatively fixed via cross member 1206*a*, set of roller frames containing roller sets. Roller set frames 1201*c* and 1201*d* share the same relationship relative to a pivot axle 1203*b* and across member 1206*b*. Cross members 1206*a* and 1206*b* may be manufactured of durable steel. In this embodiment, they are in the form of rectangular tubing affixed to the surface of the roller set frame wall at each end.

Roller assembly 902 includes base pivot brackets 1202*a* and 1202*b* connected to the roller set frames just beneath the rollers 1205 at either side of the extension boom. A pivot opening 1203*c* is provided through both pivot brackets 1202*a* and 1202*b*. Roller assembly 902 may be located just in front of the drive drum of conveyor 600 the rollers making contact with the surfaces of the bottom rails of extension boom 602. In this example there are three pivot points 1203*a*, 1203*b*, and 1203*c*. A steel rod or axle may be used to mount roller assembly 902 into a position where the rollers make contact with the bottom rails of the extension boom.

Figure 13:
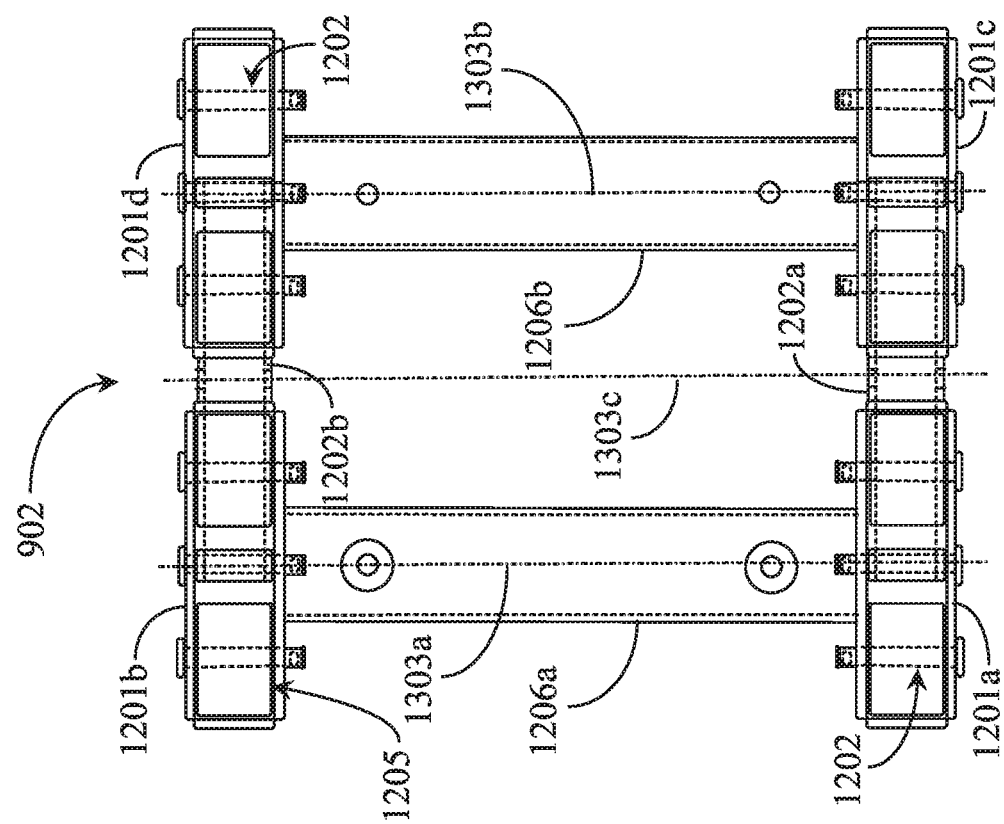
FIG. 13 is a top view of the lower front roller assembly of FIG. 12.

FIG. 13 is a top view of lower front roller assembly 902 of FIG. 12. Rollers 1205, eight in all, may be axially pined within frames as a pair of rollers to each frame. Center line 1303*a* represents a pivot axis for one side of roller assembly 902 while a center line 1303*b* represents a pivot axis for the other side of the assembly. The entire assembly may pivot about center line 1303*c*.

In this embodiment there are three pivot points. Further cross members 1206*a* and 1206*b* may flex somewhat without departing from the spirit and scope of the present invention. Rollers 1205 are axially pinned within the host frames using axle bolts or dowels 1202. Each roller set frame 1201 *a* through *d* is also axially pinned to pivot brackets 1202*a* and 1202*b*. In turn, pivot brackets 1202*a* and 1202*b* are aligned and may be mounted over a rod or dowel via openings 1203*c* (FIG. 12). Center line 1303*c* runs through pivot point 1293*c* of FIG. 12. Rollers 1205 may be rubberized and fabricated from a non-conductive material.

Figure 14:
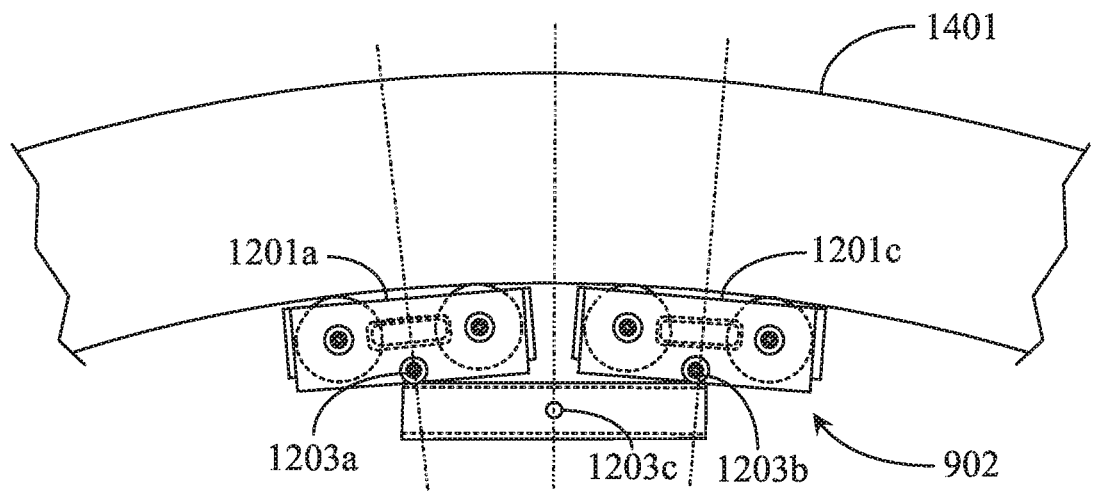
FIG. 14 is an end view of the roller assembly of FIG. 12 with load shift flexibility incorporating two or more pivot points according to an embodiment of the present invention.

FIG. 14 is an end view of roller assembly 902 of FIG. 12 with load balance flexibility incorporating at least three pivot points according to an embodiment of the present invention. Roller assembly 902 is illustrated in contact with bottom rail 1401 of the extension boom. The extension boom may come under load pressure that may create load balance differences causing flex in rail 1401 such as a bow. In such a case, roller set frames 1201*a* and 1201*b* may naturally pivot at points 1203*a* and 1203*b* to maximize roller contact and to more evenly distribute the load pressure over the rollers smoothing the mechanics of travel for the extension boom. This reduces wear and will increase the life of the apparatus at large. It is noted that the flex or bow in the opposite rail of the boom may yet be different and the roller set frames on the opposite side, namely 1201*b* and 1201*d* may pivot differently.

Figure 15:
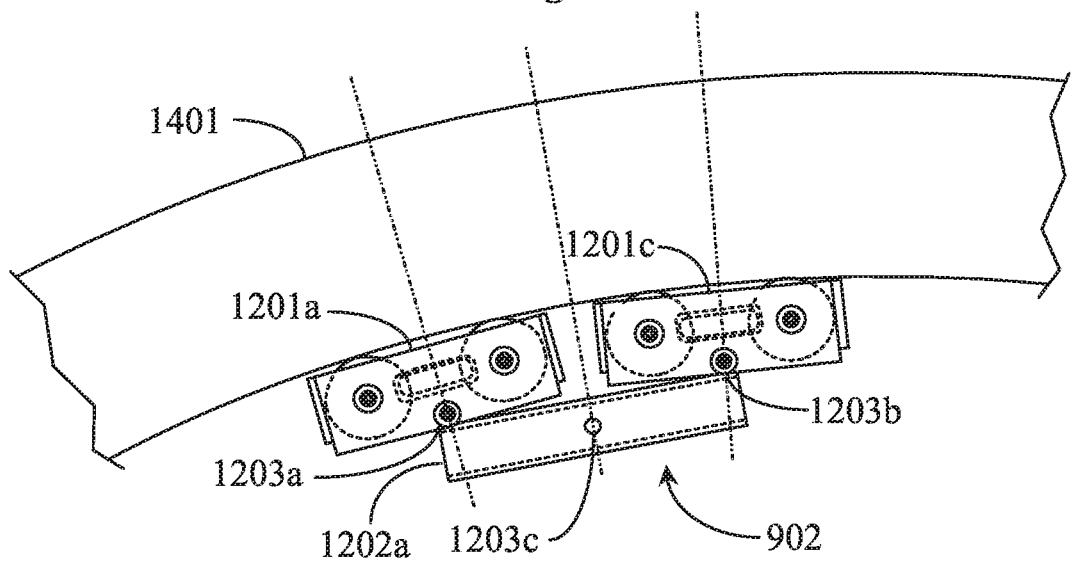
FIG. 15 is an end view of the roller assembly of FIG. 12 with load shift flexibility incorporating three pivot points.

FIG. 15 is an end view of roller assembly 902 of FIG. 12 with load balance flexibility incorporating three pivot points. In this view, roller assembly 902 is pivoted as well at pivot point 1203*c* as well as 1203*a* and 1203*b*. The angle of pivot may be different for roller sets on the opposing side depending upon the rail flex or bow on that side. Position of the extension boom on a roof top, angle of lift, and effects of material loading and transport all contribute to load pressures that may act non-uniformly on the extension boom.

Figure 16:
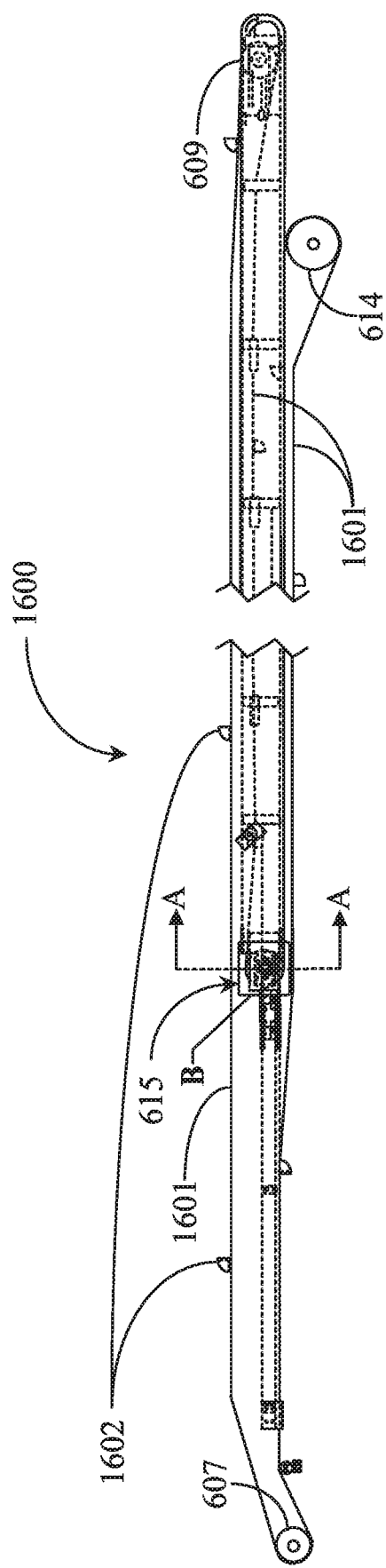
FIG. 16 is a side elevation view of the belt pathway components within the conveyer of FIG. 6 according to an embodiment of the present invention.

FIG. 16 is a side elevation view of belt pathway components 1600 within conveyer 600 of FIG. 6 according to an embodiment of the present invention. Components 1600 include a conveyer belt 1601. Belt 1601 is bounded at the rear of the main boom (boom structure not specifically illustrated) by idler pulley 607 and at the front of the extension boom by idler pulley 609 proximal to the nose loop assembly. Conveyer belt 1601 is doubled over itself to some extent and passes around pass through drum 615 and then back toward the front of the extension boom and around drive drum pulley 614.

Conveyer belt 1601 includes a plurality of material stops that prevent materials such as roofing shingles to slip off of the conveyer. Material stops may also be referred to herein as cleats. In this example drive drum 614 is driven in a clockwise direction to move the conveyer belt forward. The material stops, starting from the drive drum 614, travel about pulley 607 and on top of the booms, about pulley 609 through the nose loop assembly, through the pass through drum and back to the drive drum 614. The exact amount of overlap distance may change as the extension boom is extended and or retracted to certain distances. In typical practice the conveyer is stabilized on the roof top before the conveyer belt is started and material is loaded. Although not detailed in this view, pass through drum 615 includes a roller arrangement that supports conveyer belt 1601 and that enables safe pass through of material stops 1602.

In some case a taller cleat or material stop is needed to deliver goods via conveyor that are taller than average, such as rolls of tar paper, rolls of rolled roofing, taller stacks of materials or insulation. In other cases it is possible for operators to move materials to a roof in a faster manner with a taller cleat as long as safety precautions are taken and load capacity is not exceeded. The inventor has solved this problem with the invention of a fold down cleat or reduced height material stop. Typically the cleat or material stop's height is limited by the clearance that exists as the cleat travels underneath the boom on its way back to the loading (top) side of the conveyor. The inventor has devised a rather clever hybrid cleat or material stop that has the ability to fold down as it travels around the nose loop of the boom maintaining a lower profile while travelling underneath the boom and transitions to a taller cleat as it emerges from the underside of the boom in preparation to take taller and heavier loads.

FIG. 26A illustrates such a cleat 2600. Cleat 2600 has the ability to fold down thereby reducing the height as it travels around the end of the boom. To accomplish this cleat 2600 incorporates a shaft 2605 held on one end by a receiver element 2606 while the other side passes through a hole in the side of cleat through cleat side 2607. Inserted during assembly around this shaft is a spring constantly applying pressure sufficient to flip or fold the cleat 90 degrees on its back side 2603 thereby reducing the height while traveling under the conveyor towards the bottom where it will be urged to the upright tall position by a small bar.

Referring to FIGS. 26A and 26B, in normal operation the cleat 2600 is to remain in the upright position being held in place by retaining element 2602. Element 2602 receives a pin 2601 from the folding part of the cleat and retains pin via a spring loaded nub or ball 2607 of FIG. 26B. Materials loaded on the boom against this cleat will naturally exert pressure on the back side 2603 of cleat 2600 insuring the cleat will stay upright during operation.

It should be noted that nub or ball 2607 may incorporate a spring behind it to insure that once the pin 2601 of cleat 2600 is urged into receiver or retaining clip 2602 that it remain in the receiver till appropriate force urges it free from receiver 2602. Once the cleat passes the end of the boom the curvature of belt around the nose drum exerts enough force to pop pin 2601 out of receiver 2602. Once free from receiver 2602 spring 2604 urges the cleat to fold down approximately 90 degrees to a shorter profile for traveling underneath the boom. Once the cleat passes under the boom and begins to make the curvature back to the top of the conveyor a small bar on each side in the proper position catches the top of back side of cleat 2603 forces it up and urges the cleat pin 2601 into receiver 2602.

FIGS. 27A and 27B illustrate a side view of the hybrid cleat that has the ability to rotate 90 degrees and back again. FIG. 27A illustrates the ball, nub or keeper 2707 with the spring 2708 behind it insuring sufficient pressure to retain pin 2701 so that cleat remains in its upright position when clipped in to receiver. Also shown are cleat body 2705, the rod 2705, the spring 2704 on the rod 2705 and the rod keeper 2706.

Figure 17:
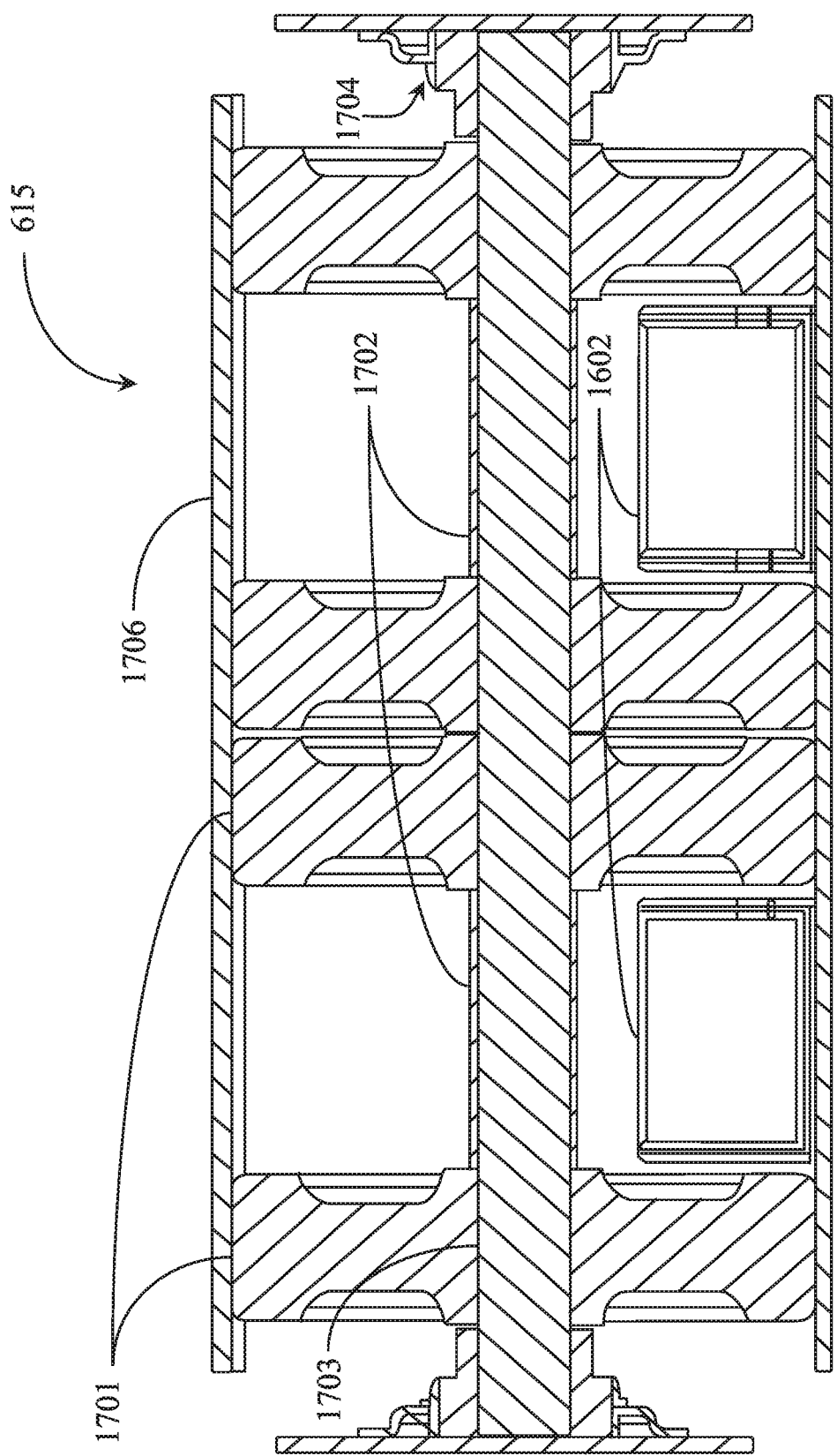
FIG. 17 is a sectioned view of the pass through drum of FIG. 16 taken along section lines A-A.

FIG. 17 is a sectioned view of pass through drum 615 of FIG. 16 taken along section lines A-A. Pass through drum 615 includes four rollers 1701 mounted onto a roller shaft or axle 1703. Axle 1704 is rotable by way of insert bearings 1704 at both ends of the shaft. In this example, rollers 1701 are spaced apart on shaft 1703 by spacer cylinders 1702 with one roller at each end of shaft 1703 and two rollers 1701 stacked at center. Spacer cylinders 1702 are longer than the width dimension taken across the face of the material stops 1602 providing space for the stops to pass through the drum without making contact with any portion of the conveyer system.

Rollers 1701 may be fabricated of non-conductive composite materials and may be rubberized for traction against conveyer belt 1706. In one embodiment Pass through drum 615 is located at the rear of the extension boom just forward of where the push bar apparatus connects to the extension boom. Connecting the pass through drum to the extension boom at the rear allows for telescopic extension of the extension boom to lengths that would otherwise not be possible. Pass through drum 615 may also be adjusted for belt alignment at its mounting location on the extension boom.

Figure 18A:
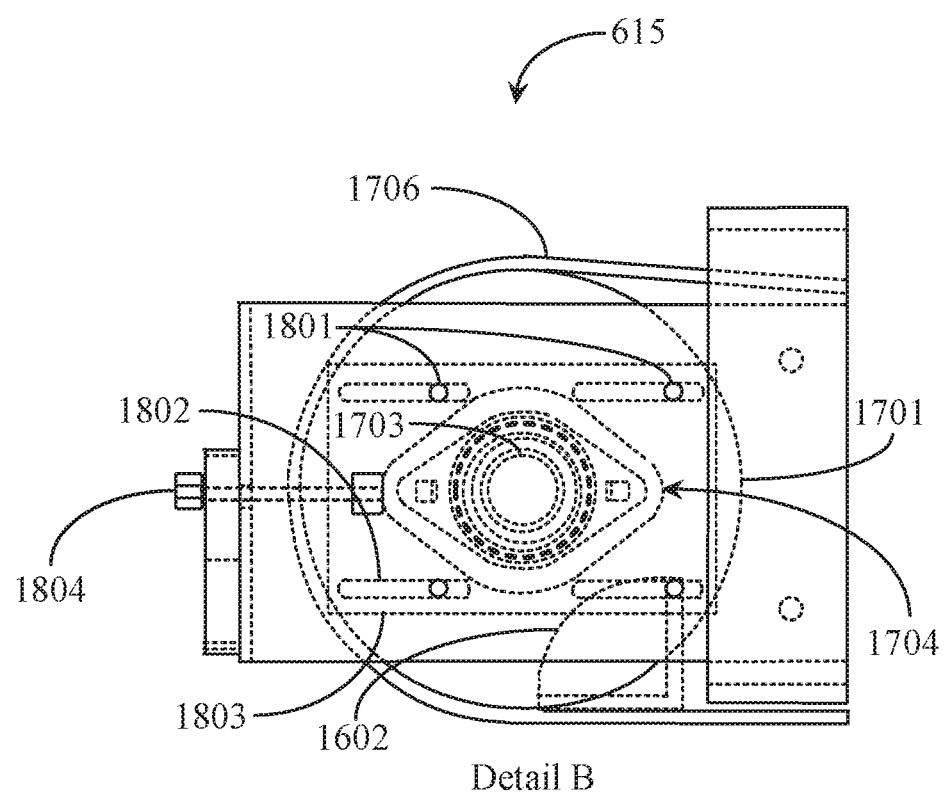
FIG. 18A is an exploded side-elevation view of detail B of FIG. 6 depicting the pass through drum of FIG. 16 according to an embodiment of the present invention.

FIG. 18A is an exploded side-elevation view of detail B of FIG. 6 depicting pass through drum 615 of FIG. 16 according to an embodiment of the present invention. Pass through drum 615 includes adjustment mounting plates 1803 (one per side). Mounting plates 1803 include a pattern of elongate mounting slots 1802 (four slots per plate). Each elongated slot corresponds to a bolt 1801. The 4 Bolts 1801 are tightened to an exacting torque to allow plate 1803 to be tight and yet allow plate 1803 to slide when an adjustment is made via bolt 1804. The bolts 1801 cannot be loosed or tightened without taking off the belt and removing the extension boom. Shaft 1703 is fixedly mounted to adjustment plates 1803. Therefore adjustment of the alignment of the conveyer belt 1706 is accomplished by bolt 1804 which is in contact with axel 1704 and moves said axel when an adjustment is made. These adjustments may be made if necessary before the extension boom is positioned on a roof top and before the conveyer belt is started for material loading and conveyance. Again, to adjust the alignment of the 1706 belt, there is one adjuster bolt 1804 attached to each plate 1803 that moves the 1803 plate forward or backward to align the pulley. The 1801 bolts are always in a somewhat "loose" state to allow this adjustment. Nyloc nuts are needed to keep the bolts in tight yet adjustable state. Nyloc nuts are also referred to nylon-insert lock nut, polymer-insert lock nut, or elastic stop nut. It is a nut with a nylon collar insert that resists turning after adjustment.

In another embodiment of the present invention FIG. 18B shows a similar adjustment to pass through drum 615. The adjustment of drum 1701 is accomplished in the same way as FIG. 18A. Bolt 1804 is adjusted by pressing on axel 1704 which is attached to plates 1803 which are tightened with just enough force via bolts 1801 and Nyloc nuts to slide to the desired adjustment without loosening after the desired adjustment is made.

Figure 19:
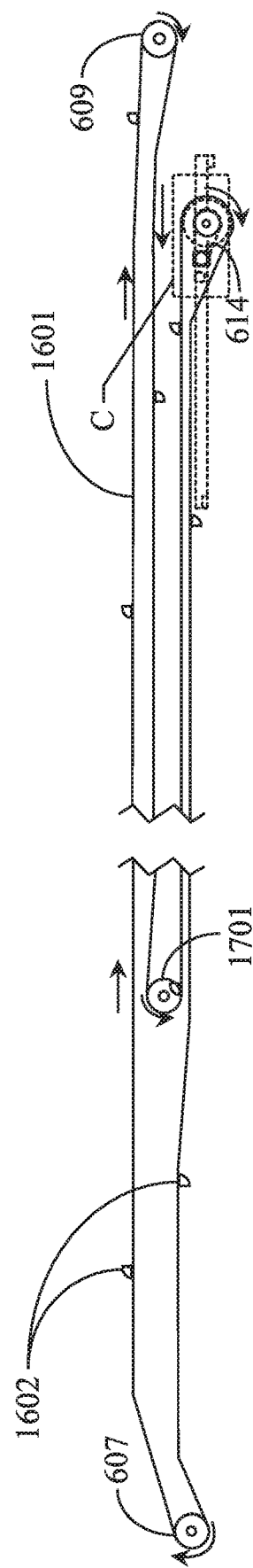
FIG. 19 is a side elevation view of the belt support apparatus of the conveyer system of FIG. 6.

FIG. 19 is a side elevation view of the belt support apparatus of the conveyer system of FIG. 6. Conveyer belt 1601 is driven by drive drum 614 located below the extension boom and behind the pulley 609 at the nose loop assembly. The drive drum roller is somewhat larger than other rollers in the system up to twelve inches in diameter. They may be rubberized for traction with belt 1601. When the extension boom is extended and supported on a rooftop, a remote control may be used to start the drive drum, which has a short chain drive connection to a hydraulic motor shaft having a drive sprocket affixed thereto as revealed by detail C of the drive drum further below.

Material stops 1602 are fastened to conveyer belt 1601 and act to prevent material slippage. In this embodiment, drive drum is rotating in a clockwise direction to bring materials to a rooftop. It also operates in reverse to bring materials down from the rooftop. Belt 1601 is functional and remains operational relative to extension and retraction of the extension boom. Tensioning of the belt may be performed at drum (607).

Figure 20:
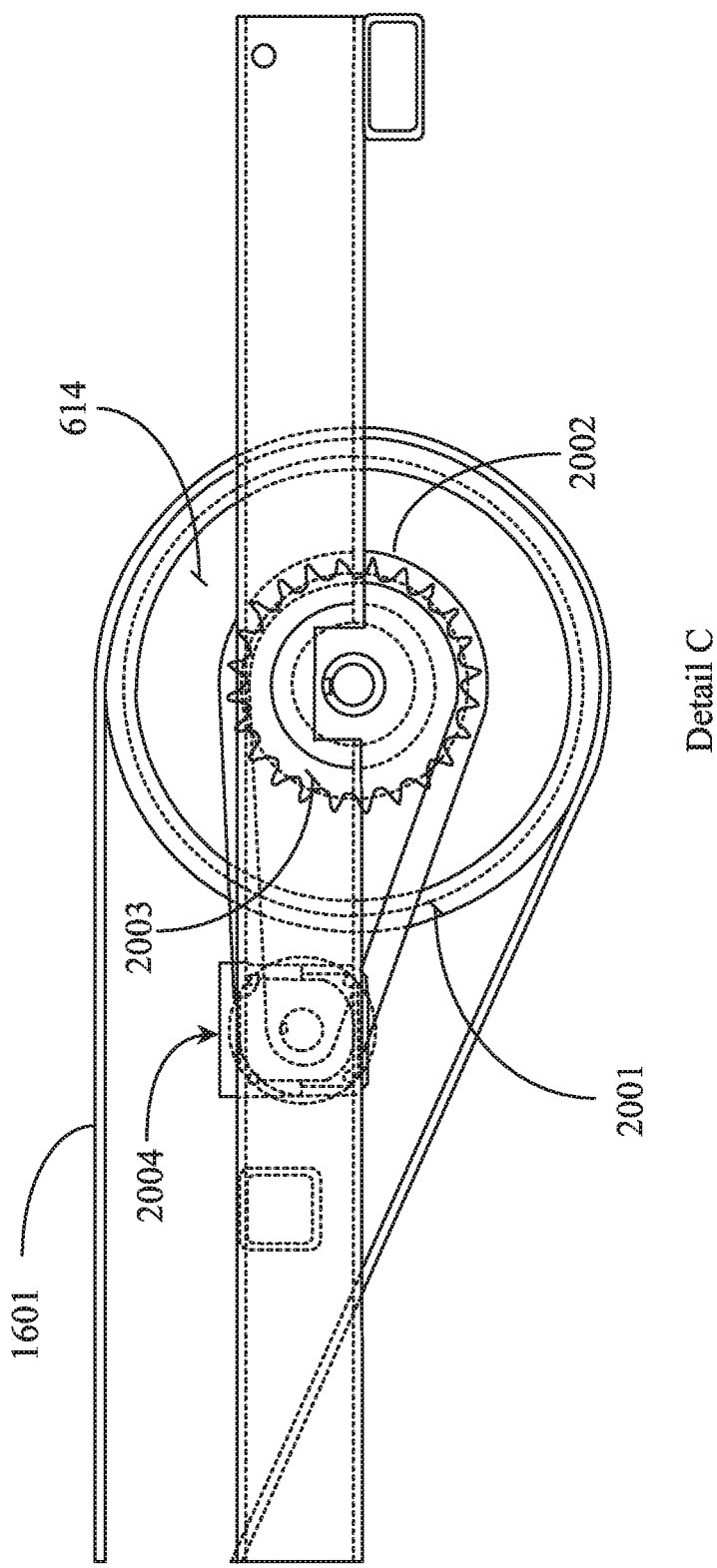
FIG. 20 is an exploded side-elevation view of detail C of FIG. 19 depicting the drive drum of FIG. 19 according to an embodiment of the present invention.

FIG. 20 is an exploded side-elevation view of detail C of FIG. 19 depicting the drive drum of FIG. 19 according to an embodiment of the present invention. Detail C depicts drive drum 614 having a fixed chain sprocket 2003. A relatively short drive chain 2002 is provided and connects the drive drum to a drive axle and sprocket 2004 powered by a hydraulic motor. In this embodiment, drive drum wheel 614 may be rubberized with rubber material 2001 to maximize traction and reduce friction between the belt and the wheel. Drive drum 614 may be crafted from durable steel for strength.

Figure 21:
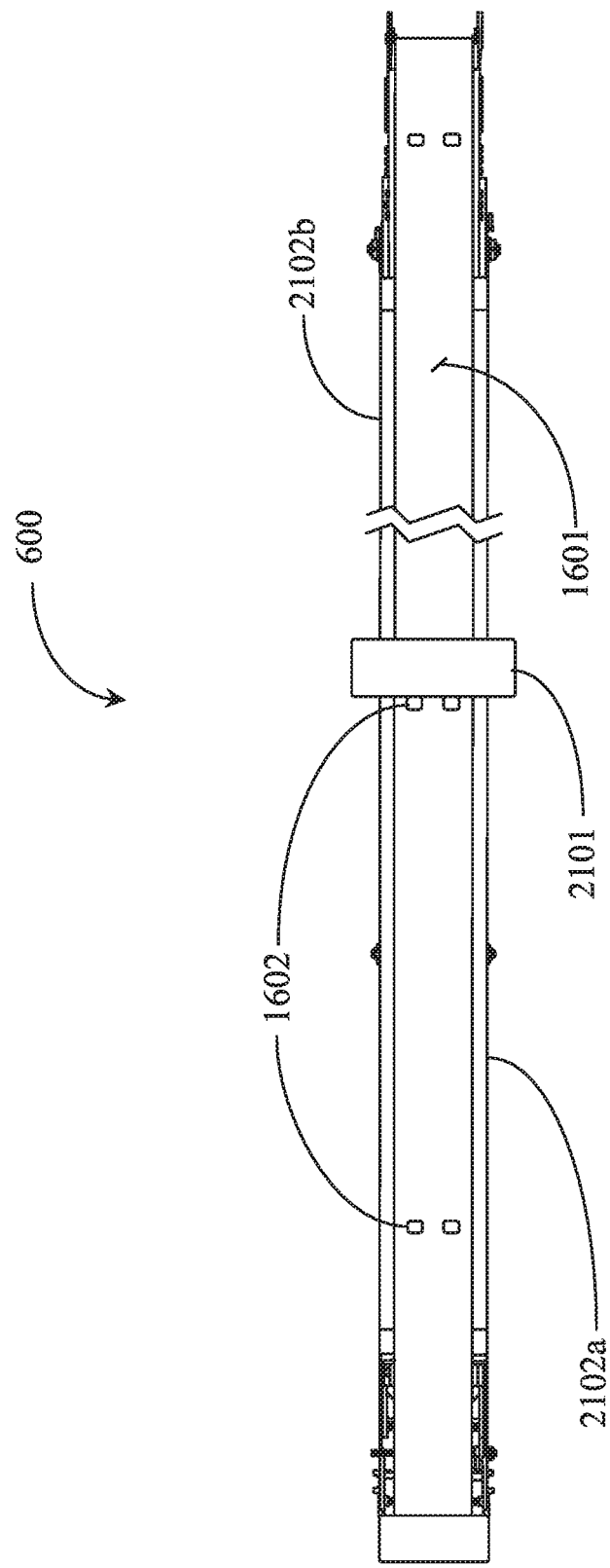
FIG. 21 is an overhead view of the of the conveyer system of FIG. 6 depicting the belt with a load according to an embodiment of the present invention.

FIG. 21 is an overhead view of the of conveyer system 600 of FIG. 6 depicting the belt with a material load according to an embodiment of the present invention. Conveyer system 600 depicts conveyer belt 1601 and material stops 1602 conveying a material load 2101 such as one or more bundles of roofing shingles for example. In general material loads such as shingle load 2101 may rub on the top rails of the boom structure along with the belt underneath causing friction wear on the boom rails.

In this embodiment, elongate friction rails 2102a and 2102b are provided and adapted to mount to specified cross members of the conveyer system and to extend over the top of the fiberglass rails of the conveyer system main boom. Similar friction rails may be provided on the extension boom without departing from the spirit and scope of the present invention.

Friction rails may be fabricated from a non-composite and non-conductive material having a low abrasive property such as fiberglass, Delron or another similar polymer. Of importance to protect is the radius at the outward edges of the conveyer boom(s). Friction rails 2102a and 2102b conform somewhat to those radii along the boom edges and protect them from being nicked, gouged, or otherwise worn down.

Figure 22:
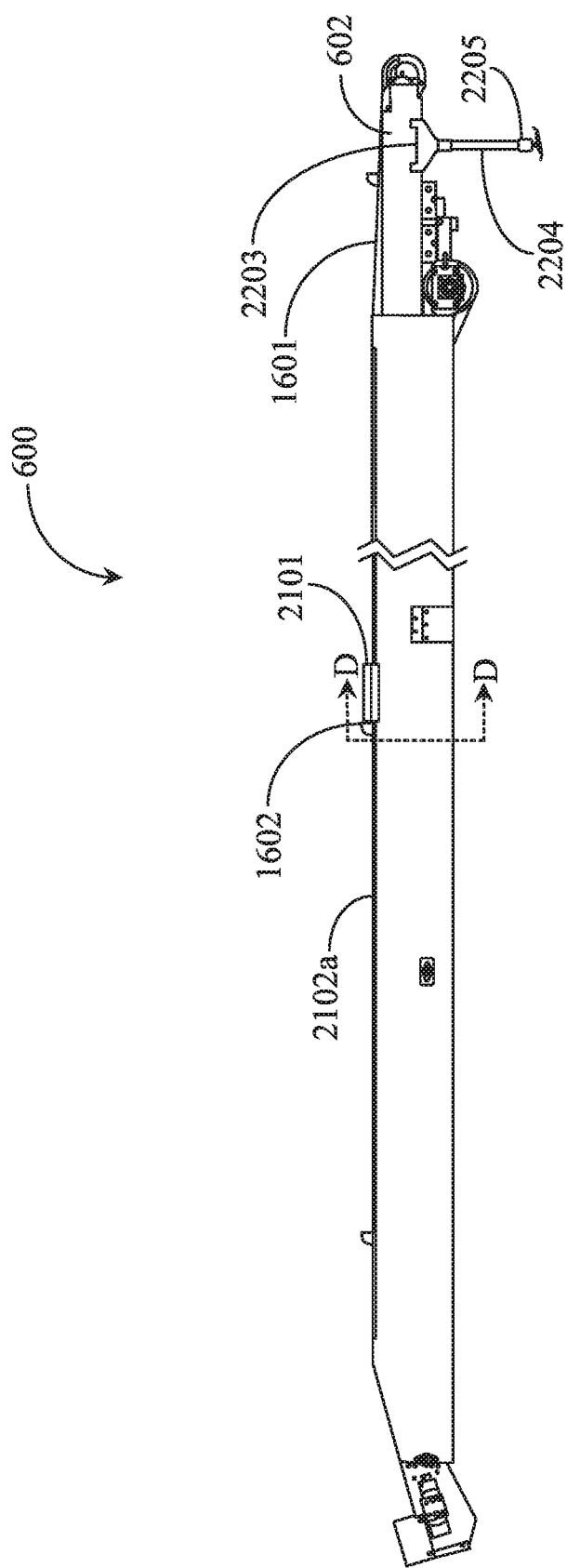
FIG. 22 is a side elevation view of the conveyer system of FIG. 6 depicting a load softening support leg according to an embodiment of the present invention.

FIG. 22 is a side elevation view of the conveyor system 600 of FIG. 6 depicting a load softening support leg 2204 according to an embodiment of the present invention. Support leg 2204 is fastened to the underside of extension boom 602 via a base fixture 2203. Fixture 2203 may be a seating fixture enabling support led 2204 to be removably attached the extension boom in order to rest the extension boom against the rooftop. Support leg 2204 includes a swivel support foot 2205. Support foot 2205 may include a ball pivot mechanism at the base of support foot 2205 to enable foot 2205 to pivot to assume the angle of the rooftop. The ability of support foot 2205 to conform to the pitch angle on a rooftop may reduce slippage of the support leg and extension boom such as when the boom is presented at different angle relative to the pitch of the roof.

Support leg may, in one embodiment, have shock absorbing properties such as a gas shock, hydraulic shock, or spring shock capabilities. In one embodiment, support leg 2205 is telescopic and may be adjusted to a longer or shorter length. Support leg 2204 functions to stabilize extension boom 602 on a rooftop and reduces load on the conveyor, as well as the lift cylinder used to raise and lower the main boom.

Figure 23:
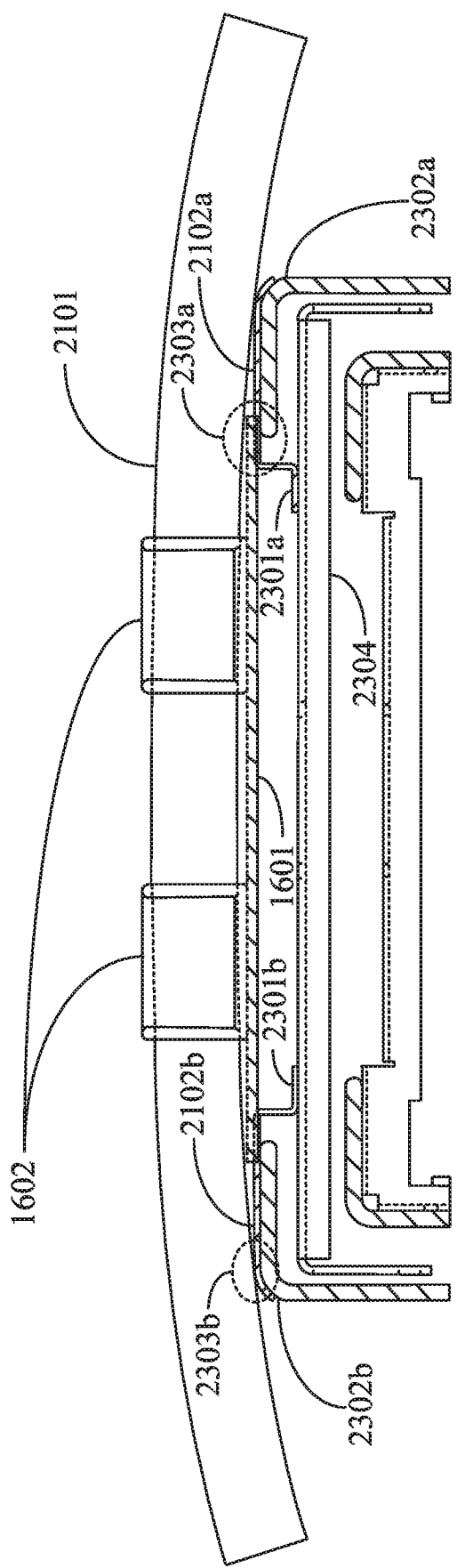
FIG. 23 is a sectioned view of the belt and belt support structure of the conveyer system of FIG. 22 take along section lines D-D.

FIG. 23 is a sectioned view of the belt and belt support structure of the conveyor system of FIG. 22 take along section lines D-D. In this view conveyer belt 1601 makes frictional contact with friction rails 2102a and 2102b referenced by friction point 2303a. Material load 2101 overlaps the conveyer edges and rubs against friction rails 2102a and 2102b referenced by friction point 2303b. As the belt moves along, material load 2101 rubs against the friction rails where they overlap the radii of the boom side rails referenced herein as rails 2302a and 2302b.

Friction rails 2102a and 2102b have a mounting edge formed on one side of the rail opposite the radiused edge resulting in a Z-type configuration that includes the height required to extend up and over the boom side-rails. The rails are mounted to boom frame cross members (main, extension). The rails are formed to rise vertically and then to extend out horizontally from the inside edge of the boom rails over the top surfaces and at least partly down the outer side of the boom housing just above the cross members. The wear rails are mounted at one edge to a plurality of cross members of the main extension boom and wherein the rails are formed to rise vertically and then extend horizontally from the inside edge over the top surfaces and at least partly down the outer side of the boom housing just above the cross members. Friction rails 2102a and 2102b are removable and replaceable. Friction rails 2102a and 2102b reduce wear on the conveyer belt edges due to low abrasive rating of the material used. The friction rails also reduce wear on the boom side rails specifically where material loads come into contact with them, typically at the edge of the conveyer booms on both sides.

Figure 24:
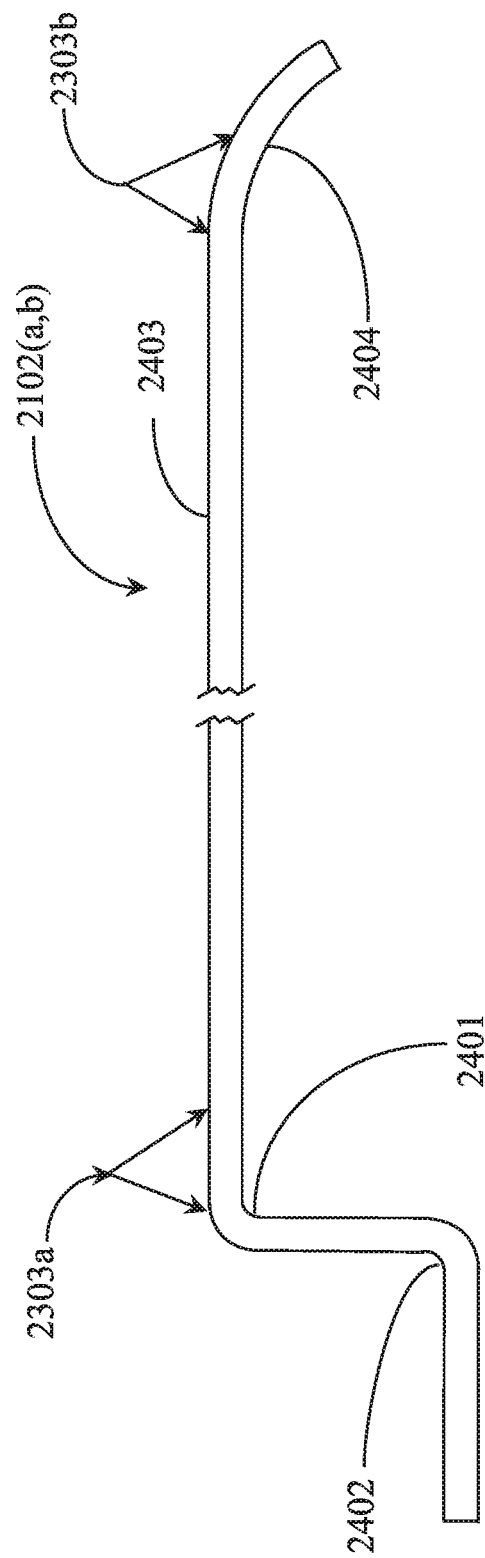
FIG. 24 is a side elevation view of a wear plate of FIG. 23.

FIG. 24 is a front elevation view of friction rail 2102 (a,b) of FIG. 23. Friction rail 2102 (a,b) includes a radius 2404 turning downward at one end and that sits over the radius edges of the main and extension boom side rails. The upper flat portion 2403 of rail 2102 (a,b) rests on the top of the boom rail. A vertical portion 2401 of the Z configuration provides extension of the rail down to a mounting flat 2402, which may be attached via snap, bolt or other method to the boom frame cross members. Wear on the friction rail from the conveyer belt occurs in area 2303a where the conveyer belt makes contact with the friction rail. Wear on the friction rail from a material load occurs in area 2303b protecting the underlying boom rail from material load contact. Friction rails may be machined in one embodiment from non-abrasive and nonconductive materials. In another embodiment, friction rails may be molded in segments and mounted linearly along the boom frame structure at the cross members.

Figure 25:
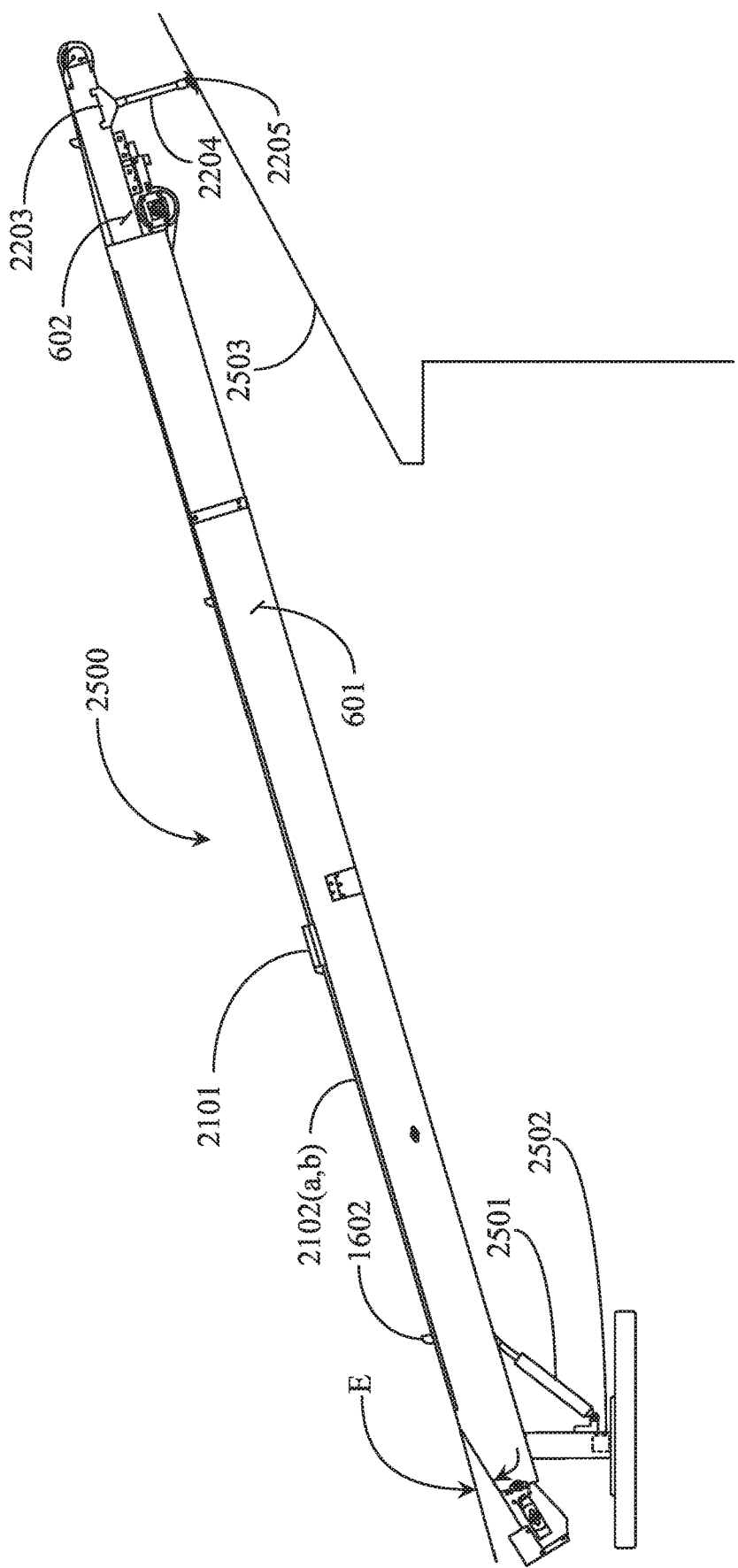
FIG. 25 is a side elevation view of the telescopic boom conveyer system of FIG. 6 connected to a turn table and positioned on a rooftop according to an embodiment of the present invention.

FIG. 25 is a side elevation view of the telescopic boom conveyer system of FIG. 6 connected to a turn table and positioned on a rooftop according to an embodiment of the present invention. Conveyer 2500 is analogous to conveyer 600 of FIG. 6 with supporting hardware added in this view for discussion. In this view the conveyer system is depicted positioned on a rooftop 2503 with the implementation of conveyer support leg 2201. The main boom of the conveyer system is connected to a saddle frame, which in turn id supported by a turntable and lift cylinder 2501 in order to attain the proper angles and lift to reach the rooftop.

Without support leg 2201, the entire load including material load pressure is focused on the lift cylinder. An electronic load sensor 2502 is provided to sense the amount of load on lift cylinder 2501. Load sensor 2502 may be programed to shut off the hydraulic motor that powers the drive drum and conveyer belt when a specified threshold of load on the lift cylinder is reached during operation. Use of support leg 2201 functions to lower the amount of load sensed at load sensor 2502. However, if the support leg is not employed and the load sensed surpasses the threshold, the conveyer belt drive drum automatically shuts down and the belt cannot be powered on manually or with a remote control until the support leg is functioning and the load is distributed. The rear portion of main boom 601 has a taper down E of approximately 15 degrees. In this way the height requirement for loading materials to be conveyed onto roof 2503 is lowered requiring less work to load the materials.

It will be apparent to one with skill in the art that the telescopic conveyer system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A telescopic material conveyer apparatus comprising:
a main boom assembly reinforced by a saddle frame connected to a turntable and a lift mechanism;
an extension boom assembly, including two opposing rails made from nonconductive materials separated by cross members forming the extension boom assembly, the extension boom assembly adapted by two or more roller assemblies, the roller assemblies each including a plurality of rollers, at least one frame mounting the rollers to the extension boom assembly via a pivot axle enabling engagement of the rollers to one of the rails; and
connecting hardware to travel mechanically within the main boom assembly and to extend therefrom, travel caused by one or more connected drive motors;
a conveyer belt supported by frame architecture and a supporting pulley and drive chain system, the conveyer belt surface extending along the top surface of the main and extension boom assembly;
at least one hydraulic motor having operative connection to the turntable, lift mechanism and to a belt drive drum connected inline to the pulley and drive chain system wherein one or more of the, saddle frame, the turntable, lift mechanism, extension boom assembly, are made of poorly-conductive metals, and when the extension boom is extended in use, the rollers maintain contact with the rails via the pivot axle when the rails flex, bow or are otherwise not planar.

2. The telescopic material conveyer apparatus of claim 1 wherein one or more of the main boom assembly, saddle frame, turntable, lift mechanism, roller assemblies, conveyor belt, frame architecture, pulley and drive chain system are made of nonconductive materials.

3. The telescopic material conveyer apparatus of claim 1 wherein one or more of the main boom assembly, saddle frame, turntable, lift mechanism, extension boom assembly, roller assemblies, conveyor belt, frame architecture, pulley and drive chain system are made of the nonconductive material poly-2,2'-(m-phenylene)-5,5'-bibenzimidazole trade name Celazole.

* * * * *